US011259671B2

(12) United States Patent
Wegelin et al.

(10) Patent No.: US 11,259,671 B2
(45) Date of Patent: Mar. 1, 2022

(54) LOW COST RADIO FREQUENCY IDENTIFICATION (RFID) DISPENSING SYSTEMS

(71) Applicant: GOJO Industries, Inc., Akron, OH (US)

(72) Inventors: Jackson W. Wegelin, Stow, OH (US); Aaron R. Reynolds, North Canton, OH (US); Chip W. Curtis, La Moille, IL (US)

(73) Assignee: GOJO Industries, Inc., Akron, OH (US)

( * ) Notice: Subject to any disclaimer, the term of this patent is extended or adjusted under 35 U.S.C. 154(b) by 0 days.

(21) Appl. No.: 17/061,601

(22) Filed: Oct. 2, 2020

(65) Prior Publication Data

US 2021/0068594 A1 Mar. 11, 2021

Related U.S. Application Data

(60) Continuation of application No. 16/273,643, filed on Feb. 12, 2019, now Pat. No. 10,791,881, which is a
(Continued)

(51) Int. Cl.
*A47K 5/12* (2006.01)
*B67D 1/00* (2006.01)
(Continued)

(52) U.S. Cl.
CPC .......... *A47K 5/1217* (2013.01); *A47K 5/1202* (2013.01); *B65D 83/00* (2013.01);
(Continued)

(58) Field of Classification Search
CPC ...... A47K 5/1217; A47K 5/1202; A47K 5/12; G05B 15/02; G05D 7/0629; B67D 7/348;
(Continued)

(56) References Cited

U.S. PATENT DOCUMENTS 4,247,018 A 1/1981 Credle
4,335,835 A 6/1982 Beigler et al.
(Continued)

FOREIGN PATENT DOCUMENTS

EP 1605392 A1 12/2005
GB 1118419 A 7/1968
(Continued)

OTHER PUBLICATIONS

European Search Report dated Jan. 14, 2014 for European Patent Application No. EP 13 18 3873.
(Continued)

*Primary Examiner* — Frederick C Nicolas
(74) *Attorney, Agent, or Firm* — Calfee, Halter & Griswold LLP

(57) ABSTRACT

A radio frequency identification (RFID) dispenser that includes low cost electronic components that can read and write to the tag of a refill cartridge. In one embodiment, the reader utilizes a multi band pass filter to convert the radio frequency identification into a digital signal that is processed by a controller to perform a dispensing function representative to the code of the tag. In another embodiment, the controller utilizes an internal comparator to convert the radio frequency identification into a digital signal that is processed by a controller to perform a dispensing function representative to the code of the tag. The dispenser in both embodiments also includes a pair of transistors that write to the RFID tag of the refill cartridge. A dispenser according to the invention also includes the capability to read and/or write to tags upon cartridges employed by the dispenser, and augmenting the operation of the dispenser as a function thereof. Additionally, a dispenser of variable size is presented that is adaptable, through adjustable partitions or a telescoping cup, to receive and maintain cartridges of various sizes.

20 Claims, 17 Drawing Sheets

Related U.S. Application Data continuation of application No. 15/173,861, filed on Jun. 6, 2016, now Pat. No. 10,213,063, which is a continuation of application No. 14/459,783, filed on Aug. 14, 2014, now Pat. No. 9,357,887, which is a division of application No. 13/545,726, filed on Jul. 10, 2012, now Pat. No. 8,833,607, which is a division of application No. 12/317,674, filed on Dec. 29, 2008, now Pat. No. 8,240,508.

(51) Int. Cl.
| | | |
|---|---|---|
| *B67D 7/34* | (2010.01) | |
| *G05B 15/02* | (2006.01) | |
| *G05D 7/06* | (2006.01) | |
| *B65D 83/00* | (2006.01) | |
| *B67D 7/08* | (2010.01) | |
| *G06K 17/00* | (2006.01) | |
| *G09F 7/00* | (2006.01) | |
| *G09F 23/00* | (2006.01) | |
| *B67D 1/08* | (2006.01) | |

(52) U.S. Cl.
CPC ............ *B67D 1/00* (2013.01); *B67D 1/0078* (2013.01); *B67D 7/08* (2013.01); *B67D 7/34* (2013.01); *B67D 7/348* (2013.01); *G05B 15/02* (2013.01); *G05D 7/0629* (2013.01); *G06K 17/00* (2013.01); *A47K 5/12* (2013.01); *B67D 2001/0811* (2013.01); *G09F 7/00* (2013.01); *G09F 23/0058* (2013.01)

(58) Field of Classification Search
CPC .......... B67D 1/0078; B67D 2001/0811; B67D 1/00; B67D 7/08; B67D 7/34; G09F 7/00; G09F 23/0058; B65D 83/00; G06K 17/00
See application file for complete search history.

(56) References Cited

U.S. PATENT DOCUMENTS

| | | |
|---|---|---|
| 4,493,435 A | 1/1985 | Hartley |
| 4,629,164 A | 12/1986 | Sommerville |
| 4,782,451 A | 11/1988 | Mazzarella et al. |
| 4,803,086 A | 2/1989 | Hedenberg |
| 4,895,276 A | 1/1990 | Maldonado |
| 4,993,595 A | 2/1991 | Bertram et al. |
| 5,042,691 A | 8/1991 | Maldonado |
| 5,161,702 A | 11/1992 | Skalski |
| 5,242,081 A | 9/1993 | Van Der Heyden et al. |
| 5,365,312 A | 11/1994 | Hillmann et al. |
| 5,494,193 A | 2/1996 | Romanyszyn, Jr. et al. |
| 5,699,091 A | 12/1997 | Bullock et al. |
| 5,706,977 A | 1/1998 | Ogura et al. |
| 5,738,153 A | 4/1998 | Gerling et al. |
| 5,842,603 A | 12/1998 | Schroeder et al. |
| 5,944,227 A | 8/1999 | Schroeder et al. |
| 6,036,055 A | 3/2000 | Mogadam et al. |
| 6,039,430 A | 3/2000 | Helterline et al. |
| 6,062,427 A | 5/2000 | Du |
| 6,312,106 B1 | 11/2001 | Walker |
| 6,318,600 B1 | 11/2001 | Winnett et al. |
| 6,325,244 B2 | 12/2001 | Vincent et al. |
| 6,390,329 B1 | 5/2002 | Maddox |
| 6,431,400 B1 | 8/2002 | O'Maley et al. |
| 6,467,888 B2 | 10/2002 | Wheeler et al. |
| 6,557,729 B2 | 5/2003 | Gauthier |
| 6,564,999 B1 | 5/2003 | Saveliev et al. |
| 6,877,642 B1 | 4/2005 | Maddox et al. |
| 6,879,876 B2 | 4/2005 | O'Dougherty et al. |
| 6,883,563 B2 | 4/2005 | Smith |
| 6,907,741 B2 | 6/2005 | Kateman |
| 6,929,155 B1 | 8/2005 | Sayers |
| 6,990,391 B1 | 1/2006 | Cunha et al. |
| 7,009,519 B2 | 3/2006 | Leonard et al. |
| 7,027,494 B2 | 4/2006 | Roh |
| 7,028,861 B2 | 4/2006 | Sayers et al. |
| 7,075,019 B2 | 7/2006 | Bergman et al. |
| 7,097,074 B2 | 8/2006 | Halliday et al. |
| 7,156,353 B2 | 1/2007 | Kringel et al. |
| 7,196,624 B2 | 3/2007 | Teller |
| 7,202,780 B2 | 4/2007 | Teller |
| 7,265,673 B2 | 9/2007 | Teller |
| 7,520,407 B2 | 4/2009 | Crosby et al. |
| 7,621,426 B2 | 11/2009 | Reynolds et al. |
| 7,783,380 B2 | 8/2010 | York et al. |
| 7,837,066 B2 | 11/2010 | Reynolds et al. |
| 8,009,015 B2 | 8/2011 | Sayers et al. |
| 8,181,822 B2 | 5/2012 | Doelman et al. |
| 8,240,508 B2 | 8/2012 | Wegelin et al. |
| 8,463,447 B2 | 6/2013 | Newman et al. |
| 8,833,067 B2 | 9/2014 | Opdenbosch et al. |
| 8,833,607 B2 | 9/2014 | Wegelin et al. |
| 9,357,887 B2 | 6/2016 | Wegelin et al. |
| 9,555,429 B2 | 1/2017 | Wegelin |
| 10,213,063 B2 | 2/2019 | Wegelin et al. |
| 10,545,044 B2 | 1/2020 | Wegelin |
| 10,791,881 B2 * | 10/2020 | Wegelin ................. G05B 15/02 |
| 2002/0170731 A1 | 11/2002 | Garber et al. |
| 2003/0006281 A1 | 1/2003 | Thomas et al. |
| 2005/0127090 A1 | 6/2005 | Sayers et al. |
| 2005/0145745 A1 | 7/2005 | Lewis et al. |
| 2005/0171634 A1 | 8/2005 | York et al. |
| 2005/0177274 A1 | 8/2005 | O'Dougherty et al. |
| 2005/0269367 A1 | 12/2005 | Post |
| 2006/0124662 A1 | 6/2006 | Reynolds et al. |
| 2006/0173576 A1 | 8/2006 | Goerg et al. |
| 2006/0180647 A1 | 8/2006 | Hansen |
| 2006/0243740 A1 | 11/2006 | Reynolds et al. |
| 2008/0029541 A1 | 2/2008 | Wallace et al. |
| 2008/0185395 A1 | 8/2008 | Sahud |
| 2010/0025427 A1 | 2/2010 | Chiou et al. |

FOREIGN PATENT DOCUMENTS

| | | |
|---|---|---|
| GB | 2416757 A | 2/2006 |
| JP | 13691/85 | 1/1985 |
| JP | 4574/86 | 1/1986 |
| WO | 2003005295 A1 | 1/2003 |
| WO | 2007070032 A1 | 6/2007 |
| WO | 2009032874 A2 | 3/2009 |

OTHER PUBLICATIONS

European Search Report dated Jan. 14, 2014 for European Patent Application No. EP 13 18 3872.
European Search Report dated Jan. 13, 2014 for European Patent Application No. EP 13 18 3871.

\* cited by examiner

LOW COST RADIO FREQUENCY IDENTIFICATION (RFID) DISPENSING SYSTEMS

CROSS-REFERENCE TO RELATED APPLICATIONS

This application claims the priority to and the benefits of U.S. patent application Ser. No. 16/273,643 which was filed on Feb. 12, 2019 and will issue as U.S. Pat. No. 10,791,881 on Oct. 6, 2020, and which is a continuation benefits of U.S. patent application Ser. No. 15/173,861 which was filed on Jun. 6, 2016 and issued as U.S. Pat. No. 10,213,063, and which is a continuation of U.S. patent application Ser. No. 14/459,783 filed on Aug. 14, 2014 and issued as U.S. Pat. No. 9,357,887, which is a division of U.S. patent application Ser. No. 13/545,726 filed on Jul. 10, 2012 and issued as U.S. Pat. No. 8,833,607, which is a division of U.S. patent application Ser. No. 12/317,674 filed on Dec. 29, 2008 issued as U.S. Pat. No. 8,240,508. Each of which is incorporated herein by reference.

TECHNICAL FIELD

The present invention is generally directed to dispensing systems. In particular, the present invention is directed to keyed dispensers which allow only certain types of material to be installed in selected dispensers and, if desired, installed by selected distributors. More specifically, the present invention is directed to radio frequency identification (RFID) fluid dispensers.

BACKGROUND ART

It is well known to provide fluid dispensers for use in restaurants, factories, hospitals, bathrooms and the home. These dispensers may contain fluids such as soap, antibacterial cleansers, disinfectants, lotions and the like. It is also known to provide dispensers with some type of pump actuation mechanism wherein the user pushes or pulls a lever to dispense a quantity of fluid into the user's hands. "Hands-free" dispensers may also be utilized wherein the user's hands are simply placed underneath a sensor and a quantity of fluid is dispensed. Related types of dispensers may be used to dispense powder or aerosol materials.

Dispensers may directly hold a quantity of fluid, but these have been found to be messy and difficult to service. As such, it is known to use refill bags or cartridges that hold a quantity of fluid and provide a pump and nozzle mechanism. These cartridges are advantageous in that they are easily installed without a mess. And the dispenser can monitor usage to indicate when the cartridge is low and provide other dispenser status information.

Manufacturers of these fluid materials enlist distributors to install the dispensers at various locations and place the manufacturer's products in the dispensers. Further, the manufacturers rely on the distributors to put the correct refill container or cartridge in the dispenser housing. For example, it would be very upsetting to hospital personnel to have hand moisturizing lotion dispensed when they instead desire antibacterial soap. Therefore, manufacturers provide keyed nozzle and pump mechanisms for each type of fluid cartridge so that only appropriate cartridges are installed in corresponding fluid dispensers.

Distributors prefer such a keying system so that their dispensers can only be refilled by them instead of their competitors. Replacement of refill containers by unauthorized distributors is sometimes referred to as "stuffing." In addition to providing keying between the dispenser and the fluid refill bag to ensure the compatibility of the product with the dispenser, keying is used to ensure that competitors of the distributor do not obtain the distributor's business. And it is also critical to the manufacturer that competitors do not stuff their product into the manufacturer's dispensers. Such activity prevents the manufacturer from obtaining an adequate return on the dispensers which are typically sold at cost or less. Moreover, such "stuffing" subjects the dispenser owner to liability and disparagement when lesser quality and/or improper replacements are made.

Although mechanical keys are helpful in ensuring that the proper refill bag is installed into the proper dispenser and that the distributors maintain their business clientele and integrity, these keying systems have been found to be lacking. For example, if a distributor's competitor cannot install its refill packages into the distributor's dispenser device, the competitor may remove or alter the keying mechanism. As such, inferior fluid may be installed into a particular dispenser and the preferred distributor will lose sales. Mechanical keying also necessitates significant tooling costs underwritten by the manufacturer to design special nozzles and dispensers that are compatible with one another. In other words, each dispenser must be keyed for a particular product, a particular distributor and perhaps even a particular location. Accordingly, the inventory costs for maintaining refill bags with a particular key is significant. And the lead time for manufacturing such a refill bag may be quite lengthy. Moreover, the particular identification of a particular keying device may be lost or damaged so that it is difficult to determine which type of keying configuration is needed for the refill bags.

One attempt at controlling the type of product associated with a dispenser is disclosed in U.S. Pat. No. 6,431,400 B1. This patent discloses a refill bag or cartridge that utilizes a wafer with an embedded magnet that must be properly oriented into a housing in order for the magnet to be detected and effectively close an on/off switch. If the magnet is not detected then the dispenser is disabled. Although effective in its stated purpose, the device disclosed in the patent is lacking in that a specific orientation is required for installation of the refill container.

Electronic keys are also known in the art. One such electronically keyed dispenser is disclosed in co-owned U.S. Pat. No. 7,028,861. This patent discloses several ways to apply radio frequency (RFID) tags or smart labels; and related mediums; however it is lacking because it does not disclose the specific means to accomplish radio frequency identification (RFID) communication. In addition, this reference does not contemplate writing to the RFID tag, which would prevent reusing the cartridge within another dispenser or reloading the dispenser after the fluid has been depleted.

It is also desirable that a dispenser have the ability to so monitor the cartridge it is tendered or has received, that it operates to ensure that the dispenser is never "empty"; that full quantities of liquid are dispensed, as determined by the nature of the cartridge and the volume of liquid therein; that the identity of cartridges to be accepted thereby is first and automatically established upon installation of the dispenser; and that the operating parameters of the dispenser are set and modified as a function of that identity.

Therefore, there is a need in the art for a dispenser that provides for exchanges of data between a refill container and a receiving housing utilizing a low cost RFID communication. There is also a need for an improved keying system for fluid dispensers to ensure that the proper material is installed into the proper dispenser and that the cartridge has not yet been used. And there is a need to ensure proper operation of the dispenser as a function of the nature of the cartridge recognized by the dispenser.

SUMMARY OF THE INVENTION

In view of the foregoing it is a first aspect of the present invention to provide electronically keyed dispensing systems and related methods of installation and use at a low cost.

Another object of the present invention, which shall become apparent as the detailed description proceeds, is achieved by a dispensing system comprising a housing having a first data communication device associated therewith. The first data communication device has stored therein a series of identification codes associated with the housing and having a control circuit with a quad operational amplifier circuit that demodulates an analog signal from a refill container within a target range and converts the analog signal to a digital signal. The first data communication device has a controller which decodes the digital signal into one of the identification codes; the refill container being receivable in the housing and carrying a fluid material and having a second data communication device associated therewith. The second data communication device has stored therein a matching code associated with the refill container and corresponding to one of the identification codes within the target; and an operational mechanism associated with one of the housing and the refill container to enable dispensing a measured quantity of the material.

It is still another object of the present invention, which shall become apparent as the detailed description proceeds, to provide a dispensing system comprising a housing having a first data communication device associated therewith. The first data communication device has stored therein a series of identification codes associated with the housing and a control circuit with an internal comparator of the controller that demodulates an analog signal from a refill container within a target range and converts the analog signal to a digital signal, the first data communication device having a controller which decodes the digital signal into one of the identification codes; the refill container being receivable in the housing and carrying a fluid material and having a second data communication device associated therewith. The second data communication device has stored therein a matching code associated with the refill container and corresponding to one of the identification codes within the target; and an operational mechanism associated with one of the housing and the refill container to enable dispensing a measured quantity of the material.

It is still another object of the present invention, which shall become apparent as the detailed description proceeds, to provide a dispensing system comprising a housing having a first data communication device associated therewith. The first data communication device has stored therein a series of identification codes associated with the housing and a control circuit with a dual operational amplifier and an internal comparator of the controller that demodulates an analog signal from a refill container within a target range and converts the analog signal to a digital signal, the first data communication device having a controller which decodes the digital signal into one of the identification codes; the refill container being receivable in the housing and carrying a fluid material and having a second data communication device associated therewith. The second data communication device has stored therein a matching code associated with the refill container and corresponding to one of the identification codes within the target, and an operational mechanism associated with one of the housing and the refill container to enable dispensing a measured quantity of the material.

Other aspects of the present invention are attained by providing a pair of transistors within the dispenser that communicate with (excite, provide power, read, and write to) the radio frequency identification (RFID) tag of the refill cartridge.

Further aspects of the invention are attained by a method for dispensing liquids from a cartridge of a dispenser, comprising: monitoring the dispenser to determine if the dispensing of liquid has been requested; dispensing liquid upon receipt of such request; counting a number of dispense cycles from a beginning point in time; and altering the dispensing activity of the dispenser after a particular number of dispensing cycles following said beginning point in time.

Other aspects of the invention include the provision of a method for establishing and controlling operational parameters of a dispenser employing cartridges containing material to be dispensed, comprising: reading data from a tag on the cartridge; determining operational parameters from the tag; and controlling operation of the dispenser in accordance with the parameters.

Yet additional aspects of the invention include the provision of a material dispenser adapted for use with various sizes of cartridges, comprising: a back plate; a cover over said back plate defining a cavity between the two for receipt of a cartridge; and means for adjusting a volume of said cavity for receipt of various sizes of cartridges.

These and other objects of the present invention, as well as the advantages thereof over existing prior art forms, which will become apparent from the description to follow, are accomplished by the improvements hereinafter described and claimed. The presentation herein is with regard to presently contemplated embodiments that are broadly defined, but readily perceived by those skilled in the art. For example, reference to switching elements broadly known as transistors are made without deference to a broad range of transistors including, for example, field effective transistors (FETs) and bipolar junction transistors (BJTs), to name only two.

BRIEF DESCRIPTION OF THE DRAWINGS

For a complete understanding of the objects, techniques and structure of the invention, reference should be made to the following detailed description and accompanying drawings, wherein.

BEST MODE FOR CARRYING OUT THE INVENTION

Figure 1:
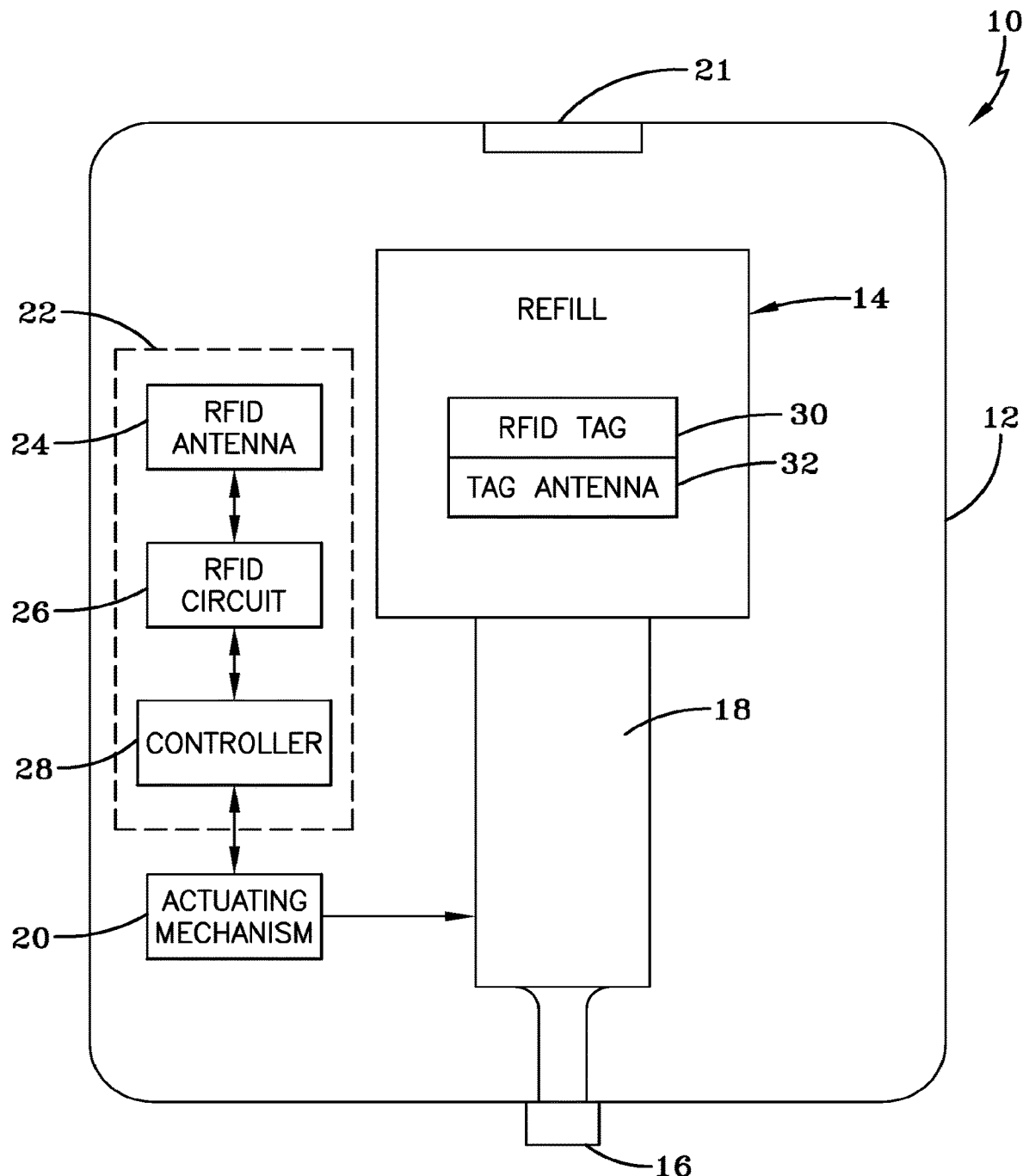
FIG. 1 is a schematic of a radio frequency identification dispenser (RFID) made in accordance with the concepts of the present invention.

It will be appreciated from a reading of the Background Art that a primary need for dispensing systems is the ability to prevent "stuffing" of competitor's refill containers in a manufacturer's dispenser or in dispensers serviced by a distributor authorized by the manufacturer. The exemplary systems disclosed herein fill this need by facilitating sharing of data between a communication device associated with the refill container and a communication device associated with the dispenser housing. Sharing of data includes, but is not limited to: the type of material within a refill container; a refill container's identification code; a concentration ratio within the refill container; a distributor's identification code; quality control information, such as manufacture dates and lot size; pump and/or nozzle size; the type of pump actuating mechanism associated with a dispenser; the type of dispenser location—restaurant, hospital school, factory, etc —; the dispenser's history of use; and so on. The communication device referred to pertains to radio frequency identification (RFID) tags or smart labels and related mediums. It is envisioned that the RFID tags will be the preferred communication device and these include chip devices that use electric, inductive or capacitive antennas; or chipless devices that utilize microwave reflectors, remote magnetics, transistors or transistor-less circuits. And the communication devices, whichever mode is selected, provide the ability to change, update and lock data stored in the devices.

A microprocessor based controller, which may be associated with the refill container, the housing, or a stand-alone device, is preferably used to facilitate the sharing of data between the communication devices. Based upon the monitoring of the communication devices undertaken by the controller, the controller controls any number of operational mechanisms that permit use of the dispensing system. The controller may also allow a single dispenser to receive and dispense materials from more than one refill container, or allow control of more than one dispenser.

The stand-alone device may be an electronic plug or key that is receivable by the dispenser housing. Indeed the key may or may not provide: a power supply, the first or second communications device, and the controller. The foregoing features and options may be selected depending upon security features desired by the distributor or manufacturer as deemed appropriate.

The dispensers disclosed herein utilize either operational mechanisms such as a push bar mechanism or a "hands-free" mechanism for dispensing a quantity of fluid. The push bar mechanism operates by the user pushing a bar that actuates a pump mechanism carried by the refill container to dispense a measured quantity of fluid. The "hands-free" device, an example of which is disclosed in U.S. Pat. No. 6,390,329, and which is incorporated herein by reference, utilizes a sensor that detects the presence of an individual's hand and then dispenses a measured quantity of fluid. The operational mechanism may also include any latching components that permit access to the housing that carries the refill container. In other words, a latch or a series of latches may be used to prevent access to the refill container. If so, then the dispensing system may not be enabled if the controller prevents unlocking of the latch mechanism. Or the controller may be operative with a mechanism that controls a pump associated with the refill container, wherein incompatibility of the communication devices may preclude actuation of the pump.

In order to operate the hands-free dispenser and other dispensers that provide status information, it is known to provide a power source, such as low-voltage batteries, within the fluid dispenser housing. Accordingly, the batteries contained within the fluid dispenser may be utilized to operate the controller and a display of a particular dispenser. In other words, the internal power may be utilized to read the communication device provided with the key or the refill container. In the alternative, and as noted previously, the power may be externally provided by the electronic key inserted into the dispenser. This feature saves on providing a power supply with each dispenser and the costs associated with replacing discharged batteries.

The features listed above provide for a dispensing system with significantly improved operational features. Indeed, use of the communication devices and their exchange of information facilitated by the controller provide for not only selective enablement of the system but also monitoring of the system. By collecting additional system information, the needs of the dispenser user, the distributor and the manufacturer can be met. For example, the dispenser's frequency of use can be determined along with peak hours of operation, use within designated time periods and so on. As will be appreciated from the detailed discussion to follow, the various features of these devices may be accomplished at a low cost as described in the different embodiments and may be utilized in any number of combinations and with one or multiple dispensers. Accordingly, reference is made to the following detailed description and figures which set out the particular embodiments.

Referring now to the drawings and more particularly FIG. 1, it can be seen that a dispenser made in accordance with the invention is designated generally by the numeral 10. The dispenser includes a dispenser housing structure of widely known dispensers, designated generally by the numeral 12. The dispenser housing 12 may be a wall or counter-mount unit, or can be a freestanding unit disposed on a counter top or the like. The dispenser described herein is used for dispensing fluids such as soaps and other liquids, but it will be appreciated that other products could be dispensed such as paper, tablets, or any flowable material. In any event, the dispenser housing 12 typically includes a cartridge 14 of liquid product positioned above and in communication with a dispensing nozzle 16, with an appropriate pump or other dispensing mechanism 18 interposed therebetween. As is well known by those skilled in the art, the dispensing mechanism 18 is configured to dispense a preset amount of liquid upon each dispensing cycle. In accordance with the invention, the dispensing mechanism 18 is controlled by an actuating mechanism 20 such as a motor, solenoid, plunger or the like. The mechanism 20 is energized upon the detection of an object, such as a user's hands, positioned beneath the dispensing nozzle 16.

The dispenser also includes a microswitch 21 that is associated with the dispenser housing 12. For example, the microswitch 21 could be positioned on the inside of the dispenser housing 12 such that the microswitch 21 is activated only upon the closure of the dispenser housing 12.

The dispenser further includes a radio frequency identification (RFID) reader 22. The reader 22 may include an RFID antenna 24, a RFID circuit 26, and a controller 28 that communicates with an RFID tag 30. It is preferred that the reader also has the capabilities to write to tag 30, which will be described hereinafter. The reader 22 is shown to be located on the dispenser so that the RFID antenna can interact with the RFID tag 30 of the refill cartridge 14.

As best seen in FIG. 1, a refill cartridge 14 includes indicia which may be disposed on any surface of the bag. The indicia includes information about the fluid materials, ingredients, date of manufacture and other pertinent product information. The RFID tag 30 incorporates a tag antenna 32. The tag 30 may also include an electronic storage device that stores a "matching" identification code and may contain other relevant information regarding the material enclosed in the bag, the size of the pump, the volume of the fluid material and the like. It will further be appreciated that the tag is stored with information and/or programmed at the manufacturer's facility and contains information that is easily changed or erased by the controller.

The invention presented and described in detail below is an improvement and refinement as to how the dispenser 10 utilizes the RFID reader 22. Now referring to the reader 22, there are three preferred circuits contemplated and described hereinafter. It should be apparent to one skilled in the art that other variations may be used without departing from the spirit of the invention.

Quad Op Amp Circuit

Figure 2:
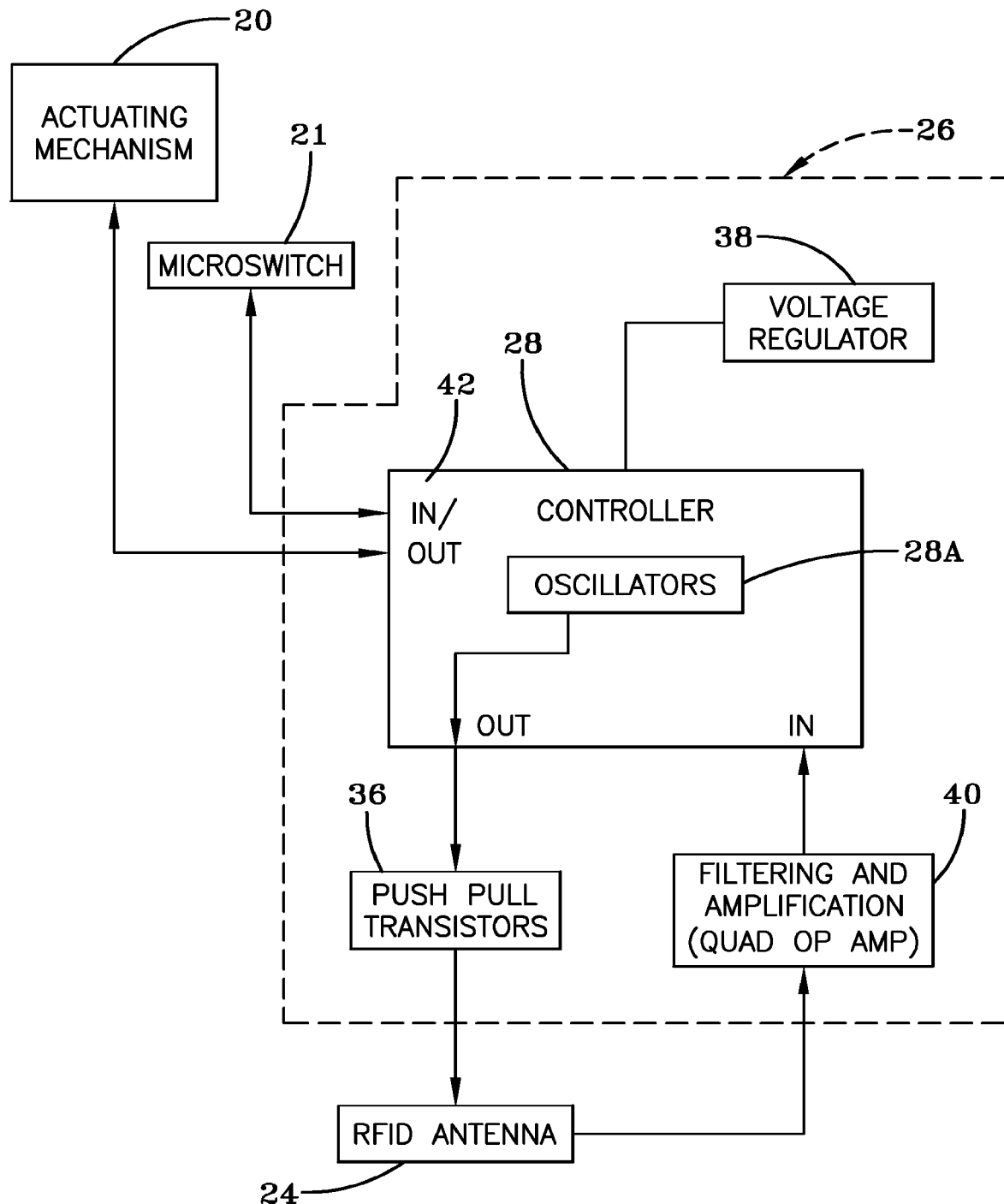
FIG. 2 is a detailed schematic of the dispenser showing a controller and the radio frequency identification (RFID) components according to one embodiment of the present invention.
Figure 3:
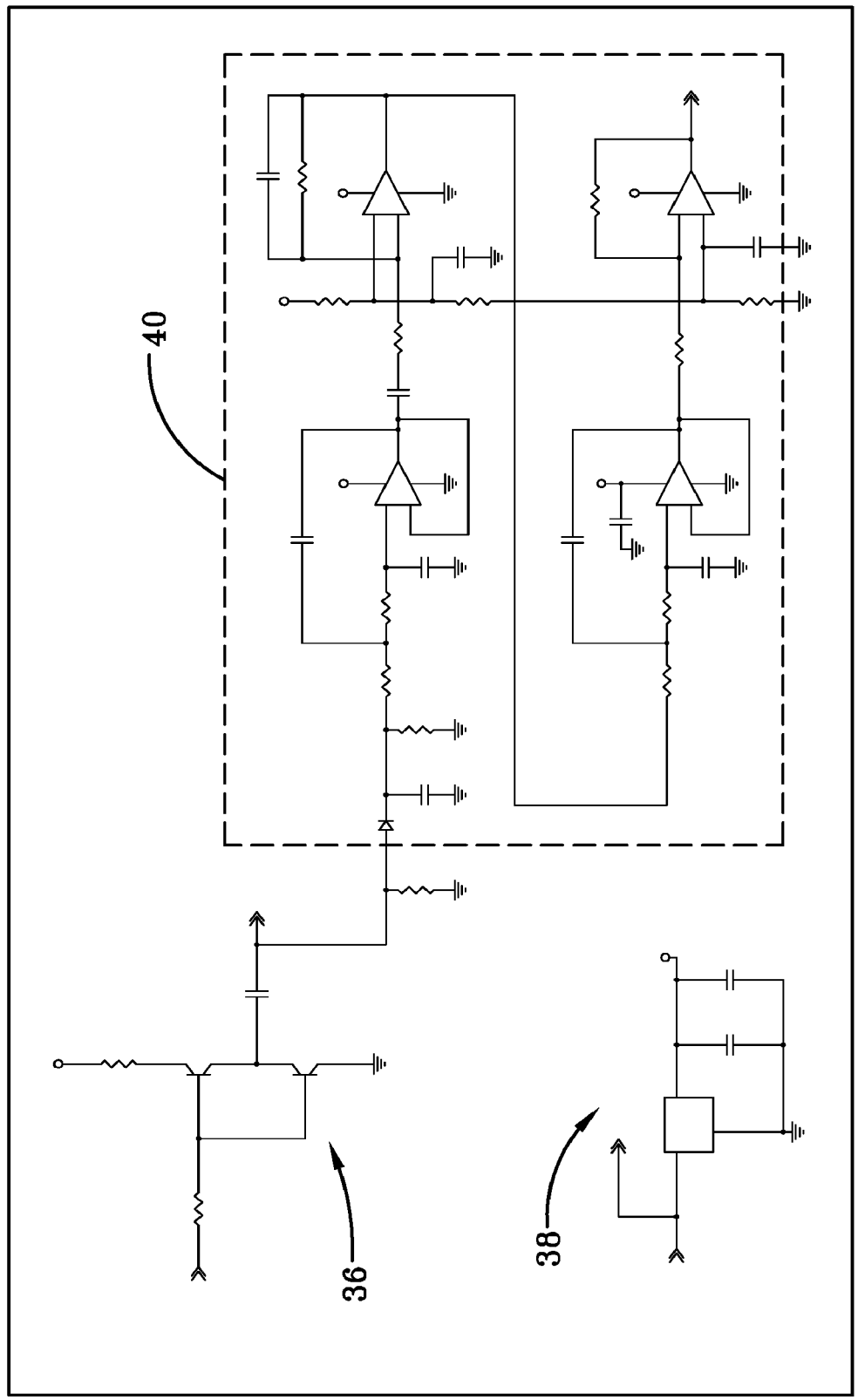
FIG. 3 is a circuit diagram of the radio frequency identification (RFID) circuit of one embodiment of the present invention.

In one embodiment as shown in FIGS. 2-3, the hardware of the RFID circuit 26 connects to the controller 28 and includes a pair of transistors 36, a voltage regulator 38, a multi-stage low pass filter 40, and an I/O interface 42. It is also assumed that a suitable source of operating power, such as a battery, is either provided as part of the reader, or is external thereto and coupled into the reader through an appropriate power connection.

For this embodiment, it should be noted that the controller 28 includes oscillator 28A to drive its internal operations. This oscillator 28A is the main time base device in the controller 28. The controller 28, in the preferred embodiment, is realized using a commercially available Zilog XP, 8-bit microcontroller.

The multi-stage low pass filter 40 (quad operational amplifier) is applied so that the four operational amplifiers are configured as a 9 kHz two-pole filter, a pulse amplifier, a 5 kHz two-filter, and a comparator. The multi-stage low pass filter 40 comprises a four stage band pass amplifier made using the operational amplifiers U4A-U4D, and associated discrete components. The operational amplifiers may be packaged in a commercially available single quad op-amp integrated circuit such as produced by Texas Instruments. The output of the multi-stage band pass amplifier's comparator is a digital signal, which is an input to the controller 28. The controller 28 includes software that decodes this digital signal, and may send a signal to the two transistors 36 to generate an outgoing signal to the RFID tag 30 of the refill cartridge 14 as will be further described hereinafter.

It is preferred that two transistors 36 are used in order to allow the controller 28 to communicate with (excite, provide power, read, and write) to the tag 30. This is desirable in order to prevent reuse of the refill cartridge 14, or prevent unauthorized tampering with the refill cartridge.

The voltage regulator 38 consists of micropower, low dropout linear regulator, and as one skilled in the art would appreciate could consist of any known equivalent circuitry to regulate the voltage supplied to the controller.

Controller Based with Internal Comparator

Figure 4:
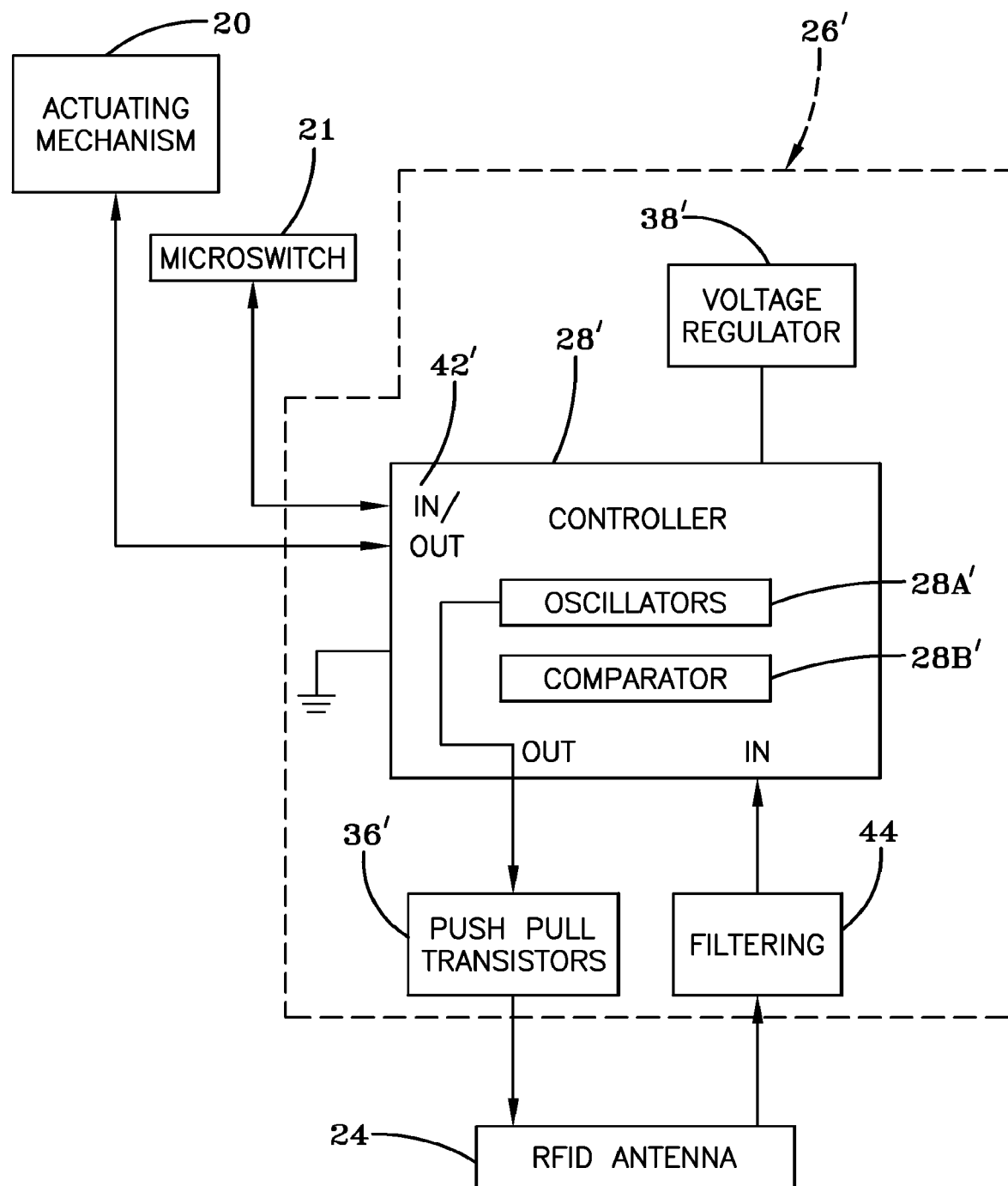
FIG. 4 is a detailed schematic of the dispenser showing a controller and the radio frequency identification (RFID) components according to another embodiment of the present invention.
Figure 5:
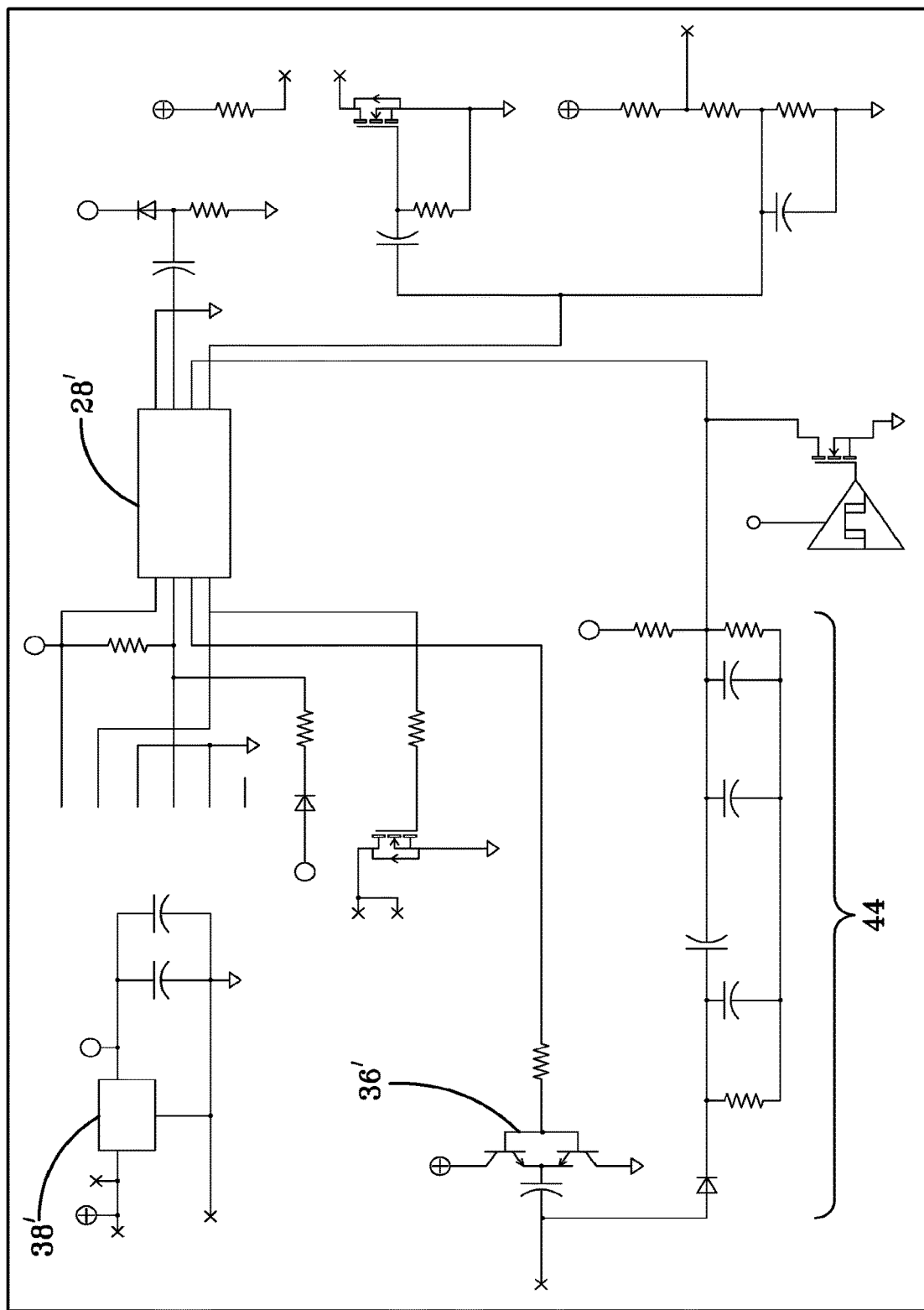
FIG. 5 is a circuit diagram of the radio frequency identification (RFID) circuit of another embodiment of the present invention.

Alternatively, the hardware of the RFID circuit 26 consists of the electronic components shown in FIGS. 4-5. The RFID circuit 26' connects to the controller 28' and includes a pair of transistors 36', a voltage regulator 38', a filtering circuit (resistors, capacitors and single diode) 44, and an I/O interface 42'. It is also assumed, that a suitable source of operating power, such as a battery, is either provided as part of the reader, or is external thereto and coupled into the reader through an appropriate power connection.

The controller 28' of this embodiment includes an oscillator 28A' along with an internal comparator 28B', which works in association with the filtering circuit to process the analog signal into a digital signal. The internal comparator 28B' converts the analog signal into the digital signal, which is then processed by the controller.

As in the hardware of the previous embodiment, this embodiment includes a voltage regulator along with two transistors as stated in the above embodiment.

As should be apparent, based on which circuit is chosen, the controller 28' provides the necessary hardware, software, and memory to implement the functions of the control circuit and properly operate the dispenser 10. The controller 28' of this embodiment could be a microcontroller such as Z8F042A manufactured by Zilog. Of course, a controller manufactured by others could be used. The controller 28' may also include, among other components, multiple oscillators and may also be used to provide software to operate other features of the dispenser. Generally, the oscillator 28A' could be an internal oscillator, which, if properly enabled, may run continuously. An alternative oscillator may be used for other functions. Skilled artisans will appreciate that the controller 28' includes a watchdog timer that is associated with the internal oscillator so that the controller may be stopped or halted for a predetermined period of time. Accordingly, full operation of the controller only occurs at predetermined increments so as to reduce current draw from a power supply. This conserves power and helps to increase the life of the power supply which may be in the form of a battery. The controller 28 generates and sends a signal to the actuating mechanism 20 as the reader 22 communicates with the RFID tag 30 of the cartridge.

Dual Op Amp and Controller Based Comparator

Figure 6:
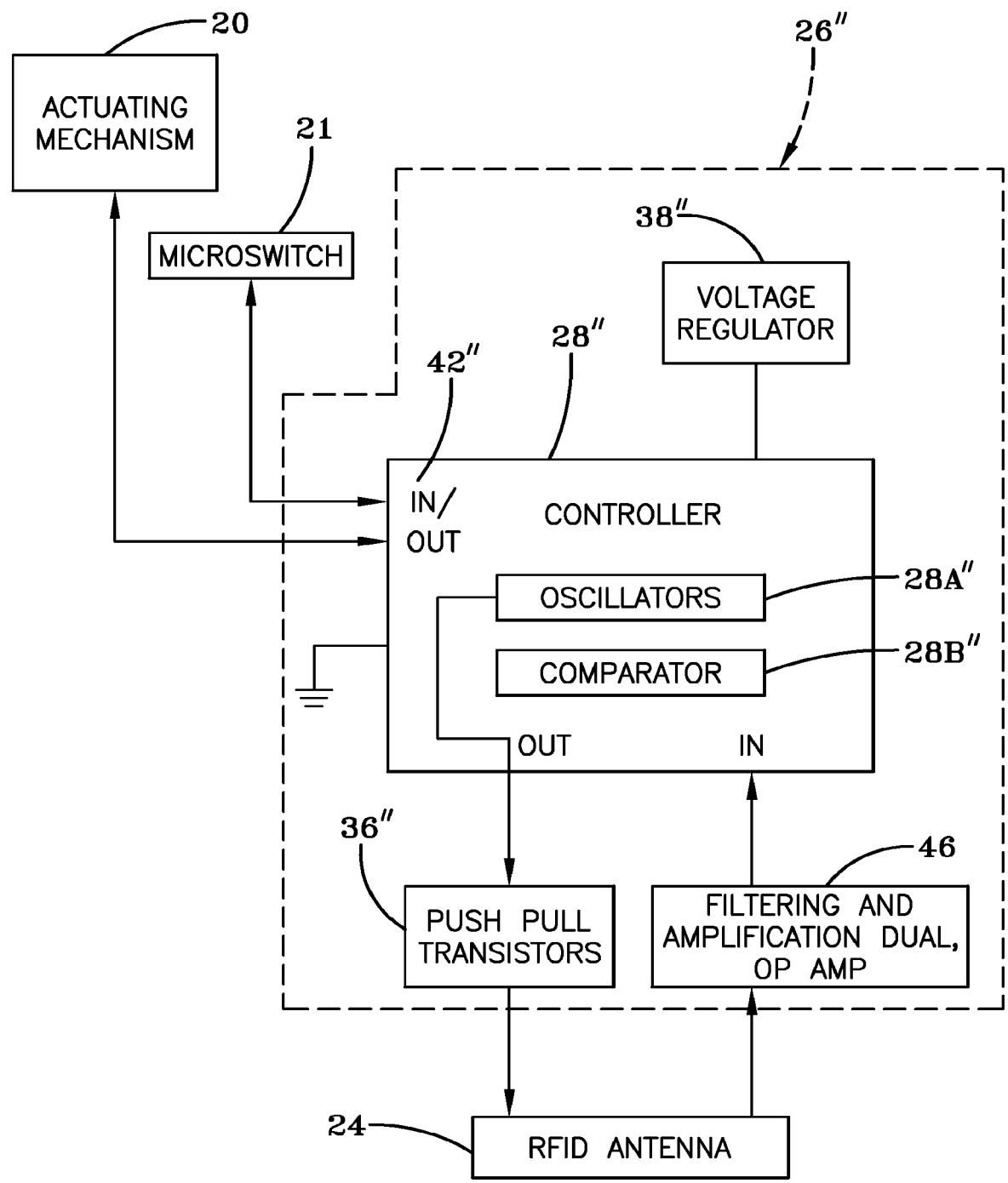
FIG. 6 is a detailed schematic of the dispenser showing a controller and the radio frequency identification (RFID) components according to another embodiment of the present invention.
Figure 7:
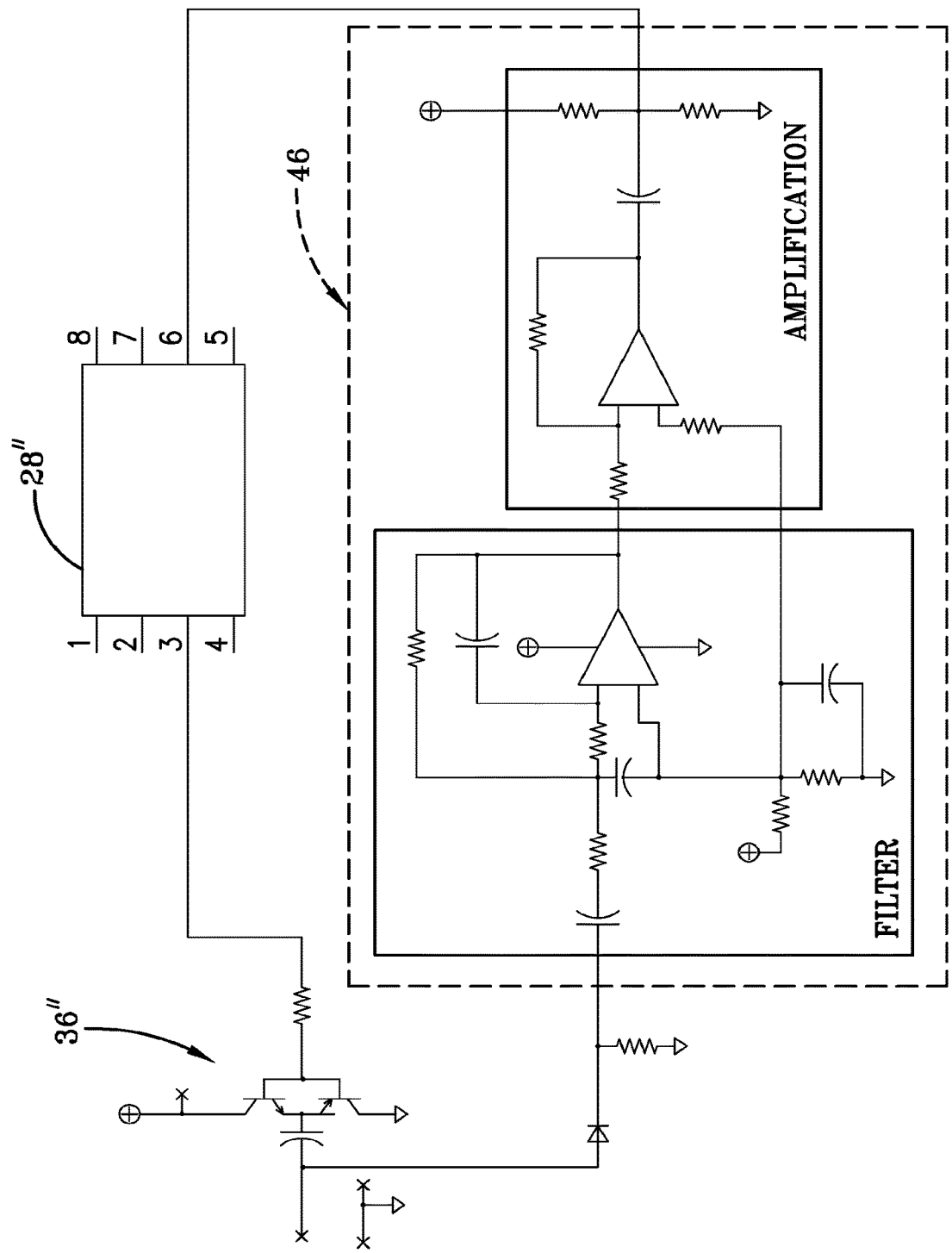
FIG. 7 is a circuit diagram of the radio frequency identification (RFID) circuit of another embodiment of the present invention.

In another embodiment as shown in FIGS. 6-7, the hardware of the RFID circuit 26" connects to the controller 28" and includes a pair of transistors 36", a voltage regulator 38", a dual operational amplifier (dual op amp) 46, and an I/O interface 42". It is also assumed, that a suitable source of operating power, such as a battery, is either provided as part of the reader, or is external thereto and coupled into the reader through an appropriate power connection.

The dual operational amplifier 46 is applied so that the two operational amplifiers are configured with resistors and capacitors to form a filter and a pulse amplifier. The operational amplifiers may be packaged in a commercially available single dual op-amp integrated circuit such as produced by Texas Instruments. The output of the dual operational amplifier is an analog signal, which is an input into the controller 28". The controller 28" includes software that decodes this digital signal, and may send a signal to the two transistors 36" to generate an outgoing signal to the RFID tag 30 of the refill cartridge 14 as will be further described hereinafter.

The controller 28" of this embodiment includes an oscillator 28A" along with an internal comparator 28B", which works in association with the filtering circuit to process the analog signal into a digital signal. The internal comparator 28B" converts the analog signal into the digital signal, which is then processed by the controller.

As in the hardware of the previous embodiment, this embodiment includes a voltage regulator along with two transistors as stated in the above embodiment.

As should be apparent, based on which circuit is chosen, the controller 28" provides the necessary hardware, software, and memory to implement the functions of the control circuit and properly operate the dispenser 10. The controller 28" of this embodiment could be a microcontroller such as Z8F042A manufactured by Zilog. Of course, a controller manufactured by others could be used. The controller 28" may also include, among other components, multiple oscillators and may also be used to provide software to operate other features of the dispenser. Generally, the oscillator 28A" could be an internal oscillator, which, if properly enabled, may run continuously. An alternative oscillator may be used for other functions. Skilled artisans will appreciate that the controller 28' includes a watchdog timer that is associated with the internal oscillator so that the controller may be stopped or halted for a predetermined period of time. Accordingly, full operation of the controller only occurs at predetermined increments so as to reduce current draw from a power supply. This conserves power and helps to increase the life of the power supply which may be in the form of a battery. The controller 28" generates and sends a signal to the actuating mechanism 20 as the reader 22 communicates with the RFID tag 30 of the cartridge.

Software

Figure 8A:
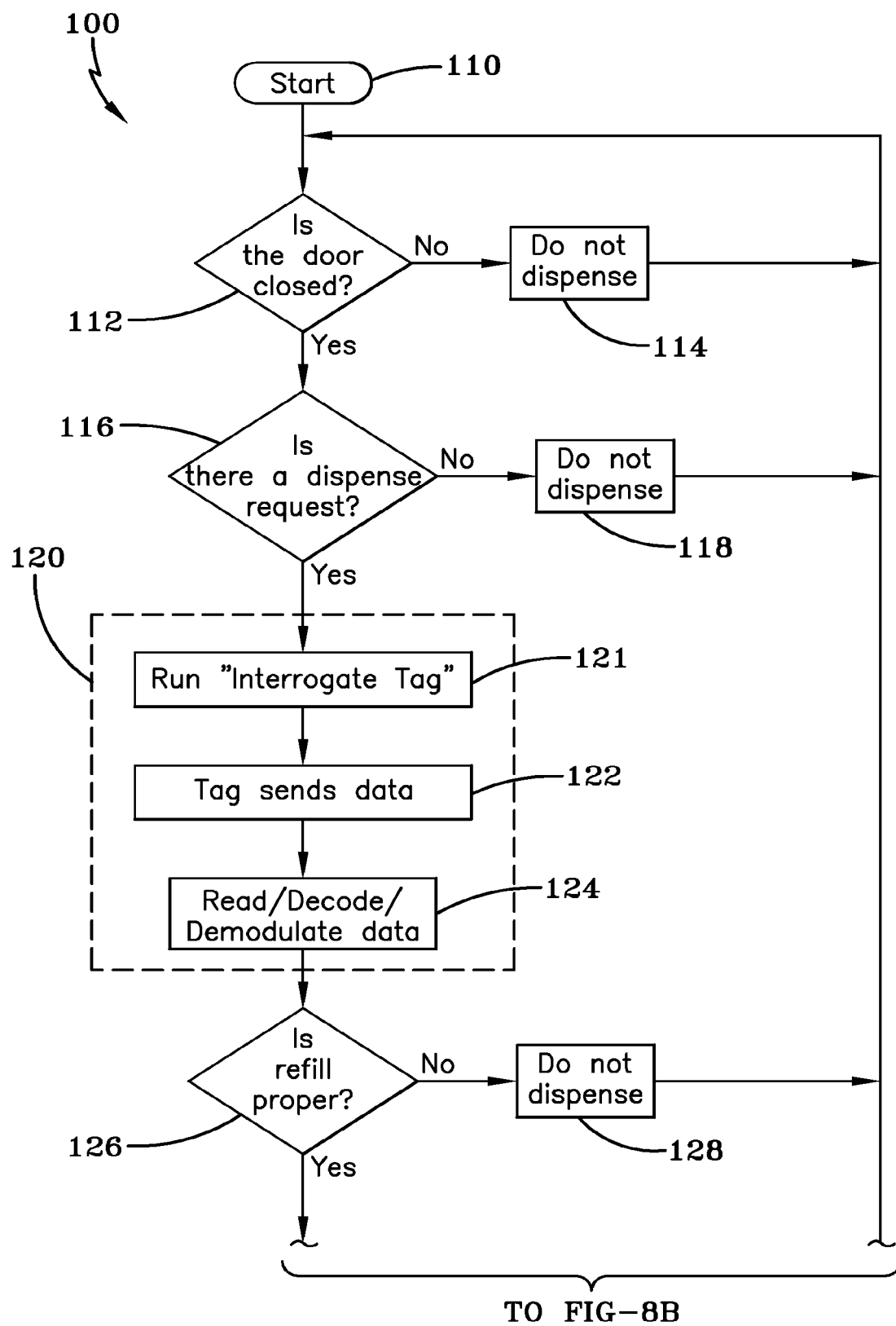
FIGS. 8A and 8B are operational flow charts of the fluid dispenser according to the present invention.
Figure 8B:
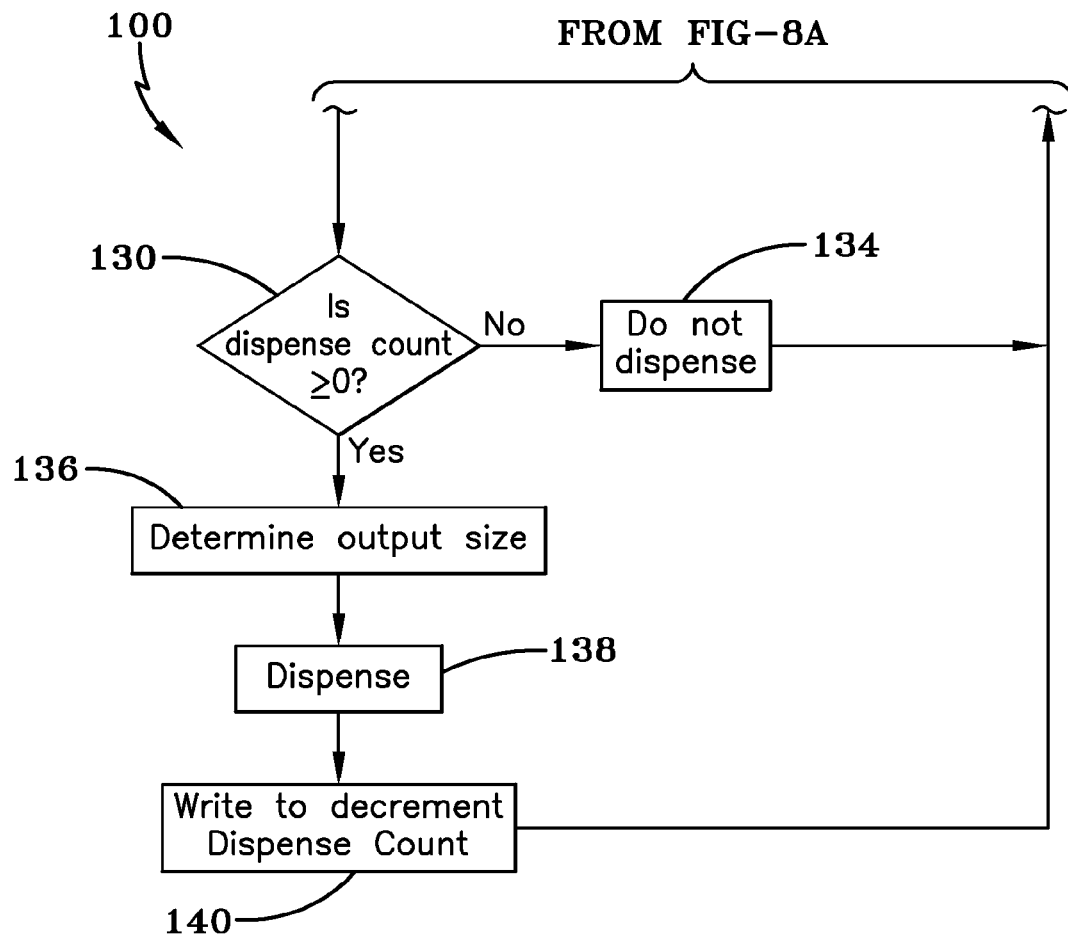

Referring next to FIGS. 8A and 8B, a flow chart is shown that details the control program(s) that are stored in the memory of the controller when used to carry out a dispensing application of the invention. Each flow chart includes a series of main steps that are depicted in "boxes" or "blocks," with a directional line or lines interconnecting each box or block to indicate how the "flow" of the operation proceeds. It is submitted that a person of skill in the art can readily program a controller, such as the controller 28 described above, with appropriate code and commands to carry out the operation depicted in the flow chart of FIGS. 8A-8B.

The exemplary flow charts shown and described herein disclose exemplary embodiments of logic for reading; logic for writing; logic for determining; logic for allowing; and logic for comparing data and preventing the dispensing. The flow charts of FIGS. 8A-8B are self-explanatory to those of skill in the art. Nonetheless, the following supplementary comments are to provide an overview of the control program's operation. The basic operating program for the reader 22 (and more particularly for the controller 28 used within the reader) is shown in FIG. 8A. The range of the reader is typically 3-4 inches. When within range, the transponder is powered by the output power signal generated by the reader.

The operational process performed by the controller for RFID interaction is designated by the numeral 100 as shown in FIGS. 8A and 8B of the drawings. For this process, it is assumed that a refill cartridge is installed within the dispenser having an RFID transponder tag. RFID interaction 100 has a start sequence at step 110. At this step 110, the controller may proceed to an optional determination at step 112 whether the dispenser door is open or closed (depending on the dispenser's structure and whether there is a switch or sensor on the door latch). If the dispensing system includes this requirement and the door is open, the dispenser does not dispense product at step 114 and returns to step 112.

If the controller does not include step 112 or determines that the door is closed at 112, then the controller proceeds to step 116 and determines whether the system is calling for a dispensing of product. If the dispensing system does not detect a dispensing request, the dispenser does not dispense product at step 118 and returns to step 112. If the controller does receive a dispense request at step 116, then the controller proceeds to the receiving steps 120.

Receiving steps 120 include the controller first interrogating the tag of the refill cartridge at step 121. The controller then proceeds to step 122 where it receives data sent by the tag, and step 124 where the controller reads/decodes the data of the tag.

The controller then proceeds to step 126 to determine whether the codes stored on the refill cartridge tag match any of the stored codes within the controller. If the tag does not match any of the stored codes of the controller, the dispenser does not dispense product at step 128 and returns to step 112. If the controller determines that the codes of the tag and controller match, then the controller proceeds to step 130. At step 130, the controller determines whether the dispense count is greater than zero. If the dispense count is zero, the dispenser does not dispense product at step 134 and returns to step 112. If the dispense count is greater than zero, the controller proceeds to step 136 where the product's output size is determined. At step 138, the controller permits the dispensing of product.

After or contemporaneous with the dispensing of product at step 140, the controller sends a signal to the two transistors to write to the tag of the refill, which decrements the value of the dispense count. After step 140 is complete, the controller returns to step 112 to be ready to receive another dispense request.

It should be noted that step 130 may also utilize another value by which the controller determines that the product is empty. This can be accomplished by assigning a value to the number of dispenses for each specific refill cartridge at the controller and either incrementing or decrementing the count until it matches a value associated with the product amount. For purposes of this embodiment, the number associated with the dispense count has a stored a number greater than zero and decrements each time product is dispensed.

Accordingly, all embodiments disclosed herein provide the advantages lacking in the prior art devices. In particular, use of an electronic key, storage of an identification code within a controller maintained in the dispenser and/or use of the matching code with a refill container allows for flexibility in a manufacturer's relationship with the distributor in that control of the number of refill bags or cartridges shipped and maintained in inventory is significantly reduced. Further, the distributor is assured of the ability to maintain its refill business and the manufacturer is assured of the distributor's use of just the manufacturer's product. Moreover, the disclosed systems ensure that the proper material of controlled quality is received by the dispenser.

With reference now to FIGS. 9-13, an appreciation can be obtained of other structures and features of the invention. With the implementation and utilization of a controller comprising a microprocessor chip or the like, various enhancements of dispenser operation can be achieved. Various such adaptations are presented in association with those figures, as discussed below.

Figure 9:
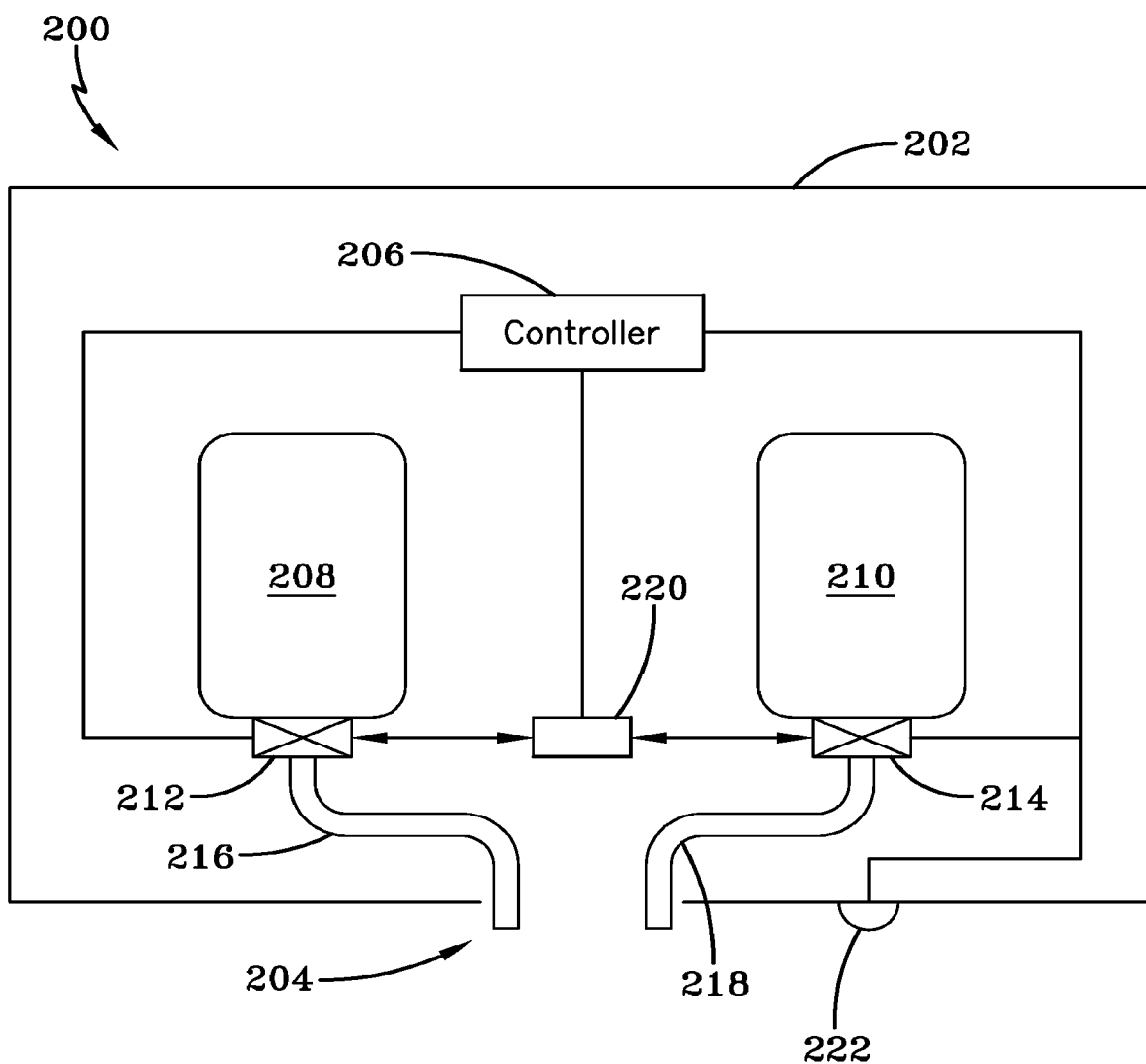
FIG. 9 is an illustrative diagram of a dispenser according to the invention and adapted for implementation of the process of FIG. 10.

Referring now to FIG. 9, a dispenser system made in accordance with the invention is shown diagrammatically and designated by the numeral 200. The dispenser system 200 includes a housing 202 having a nozzle opening 204 at a bottom portion thereof. Maintained within the housing 202 is a controller 206, the controller comprising a dedicated microprocessor chip or the like, as presented above. In accordance with this feature of the invention, the housing 202 receives and maintains a pair of cartridges 208, 210 which, in accordance with the invention, are adapted for mutually exclusive dispensing operation. It will be understood that, in a preferred embodiment of the invention, the cartridges 208, 210 are identical in nature and contain the same substance for dispensing.

Associated with each of the cartridges 208, 210 is a dispenser actuator 212, 214, which may be of various natures, depending upon whether the dispenser system 200 is an automatic "touch free" system, or a mechanically-actuated one. The differences will be discussed below. In any event, output conduits 216, 218 pass from respective cartridges 208, 210 as shown. In the implementation of the embodiment employing mechanical actuation, a shuttle 220 is interposed between the actuators 212, 214 for purposes which will be discussed herein. In the touch free system, a "hands present" sensor 222 is employed. As illustrated, dispenser actuators 212, 214 communicate with the controller 206, as do the shuttle 220 and sensor 222.

In the context of the invention the dispenser system 200 is configured to ensure that the dispenser never runs out of the soap, sanitizer or other fluid to be dispensed. Accordingly, when a first cartridge 208 is either empty or very near empty, dispensing operations from that cartridge are terminated and switched to the cartridge 210, awaiting replacement of the cartridge 208. As dispensing operations proceed from the cartridge 210, and it nears or reaches depletion, the dispensing operation is switched back to the now-full cartridge 208. Accordingly, the dispenser 200 is never depleted of the dispensable liquid.

In accordance with one embodiment of the invention, the dispenser 200 is a touch-free system, employing a non-contact sensor 222 to determine the presence of a user's hand. Upon such determination by the controller 206, the appropriate dispense actuator 212, 214 is activated for a sufficient period of time to dispense the proper amount of liquid onto the user's hand. In this embodiment, the dispense actuators 212, 214 are typically motor driven pumps, selectively and mutually exclusively driven by the controller 206. The controller 206 drives the motor associated with the cartridge from which liquid is presently being dispensed, until such time that the cartridge is at or near empty, at which time the controller switches to driving the motor associated with the other cartridge. The controller can, at that time, illuminate a light or provide another appropriate signal to indicate that a cartridge needs replaced. The operation switches back and forth upon the emptying of the cartridges.

In the mechanically-actuated version of the dispenser system 200, a shuttle 220, which can be solenoid actuated or the like, is employed to selectively engage or disengage a mechanical pump with a push bar actuator as is commonly employed with such dispensers. The shuttle 220 is actuated by the controller 206 upon determination that a cartridge 208, 210 is at or near empty.

In both embodiments, the controller 206 determines when the cartridge being employed is at or near empty, by counting the number of dispense cycles engaged. In the mechanical version, the controller counts the number of actuations of the push bar, while in the hands free version, the controller counts the number of dispensing cycles for which the associated motor and pump mechanism has been actuated.

Figure 10:
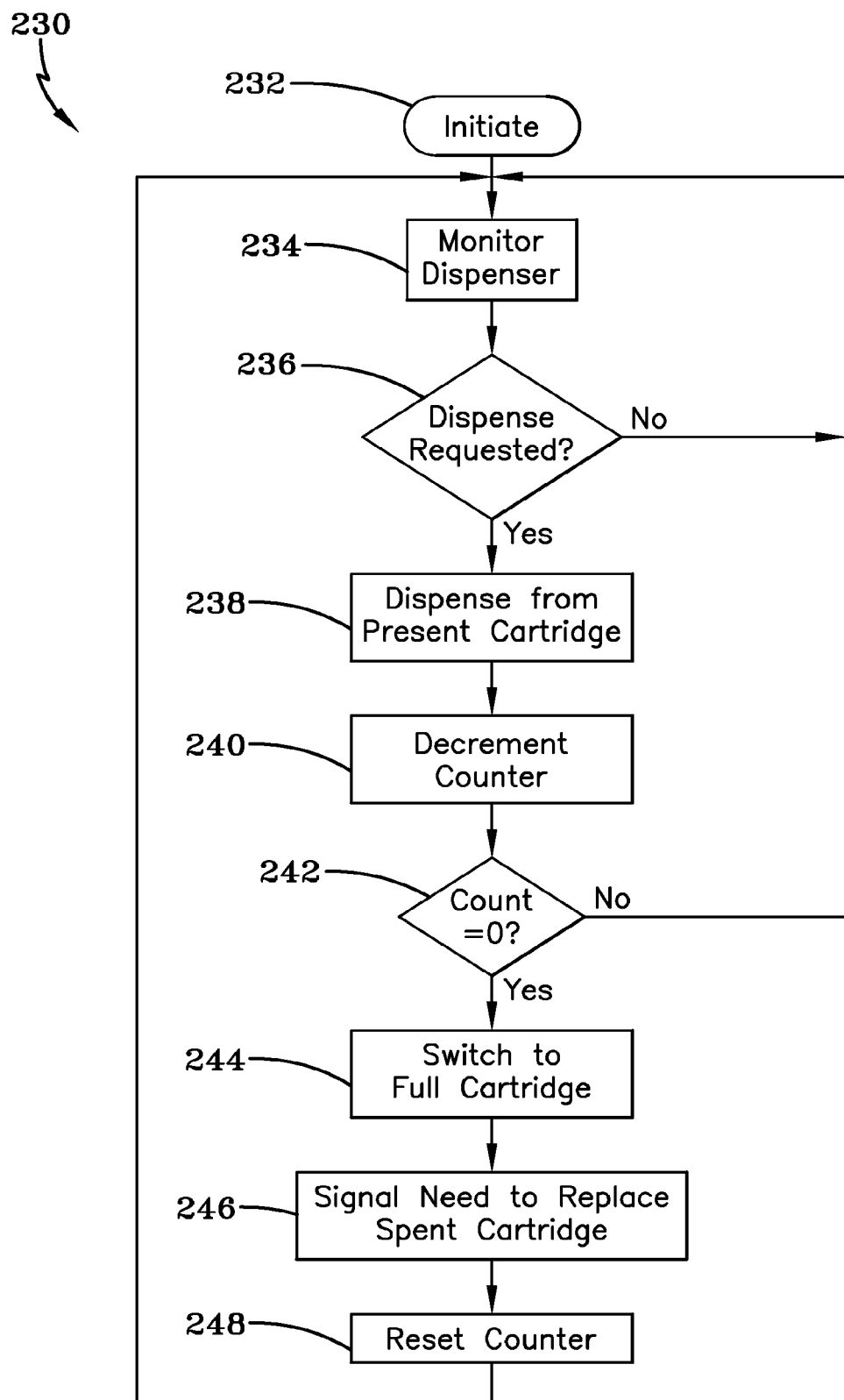
FIG. 10 is an operational flow chart for switching between cartridges in a dispenser to ensure the dispenser is never empty.

With reference to FIG. 10, a flow chart showing the operation of both the mechanical and automated system is shown as designated by the numeral 230. The program initiates at 232 and enters into a state of monitoring the dispenser at 234 until a dispense cycle is requested as at 236. The dispense cycle is requested either by detection of the presence of a user's hand through the sensor 222, or by actuation of the press bar of the mechanical system. When dispensing is requested at 236, the liquid is dispensed from the presently employed cartridge as at 238. Upon such dispensing, a counter is decremented as at 240 by the controller 206. A determination is then made at 242 as to whether the counter has counted out, leaving the count of the counter at zero. If it has not, subsequent dispense cycles continue from the presently employed cartridge 208, 210 until such time as the counter has counted out as determined at 242. At that time, a switch is made to the other full cartridge as at 244. In the mechanical system, the controller 206 activates the shuttle 220 to disengage the empty cartridge and engage the full one with the push bar mechanism. In the automated system, the controller 206 simply switches to pass its motor actuating signal to the motor pump associated with the full cartridge. Thereafter, a signal may be emitted in the form of an audible or visual signal as at 246, to indicate the need for replacement of a spent cartridge. Similarly, at 248 the counter of the controller 206 is reset to indicate the implementation of a full cartridge and the dispense cycles are again monitored and the counter decremented until the counter reaches zero, indicating that the cartridge is empty or near empty and the switching between cartridges needs to be entertained again, and the cycle continues.

Figure 11:
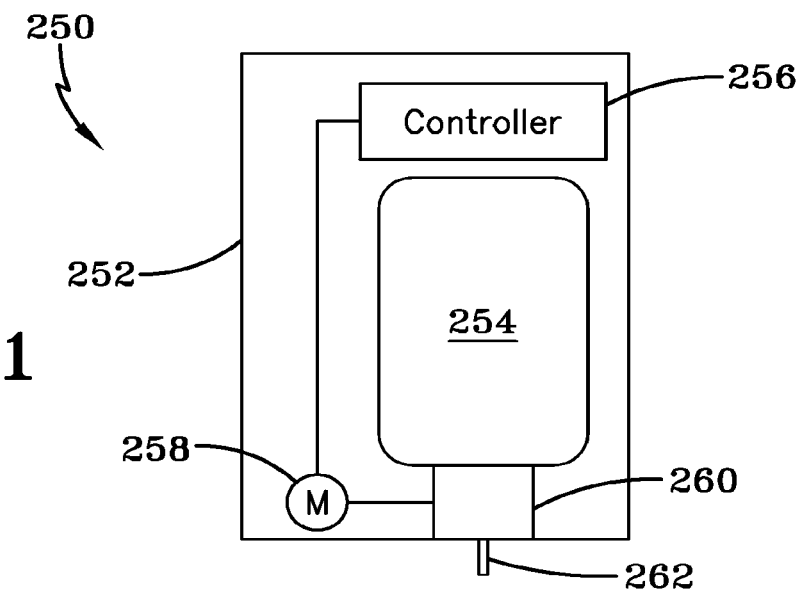
FIG. 11 is an illustrative diagram of a dispenser according to the invention and adapted for implementation of the processes of FIGS. 12 and 13.
Figure 12:
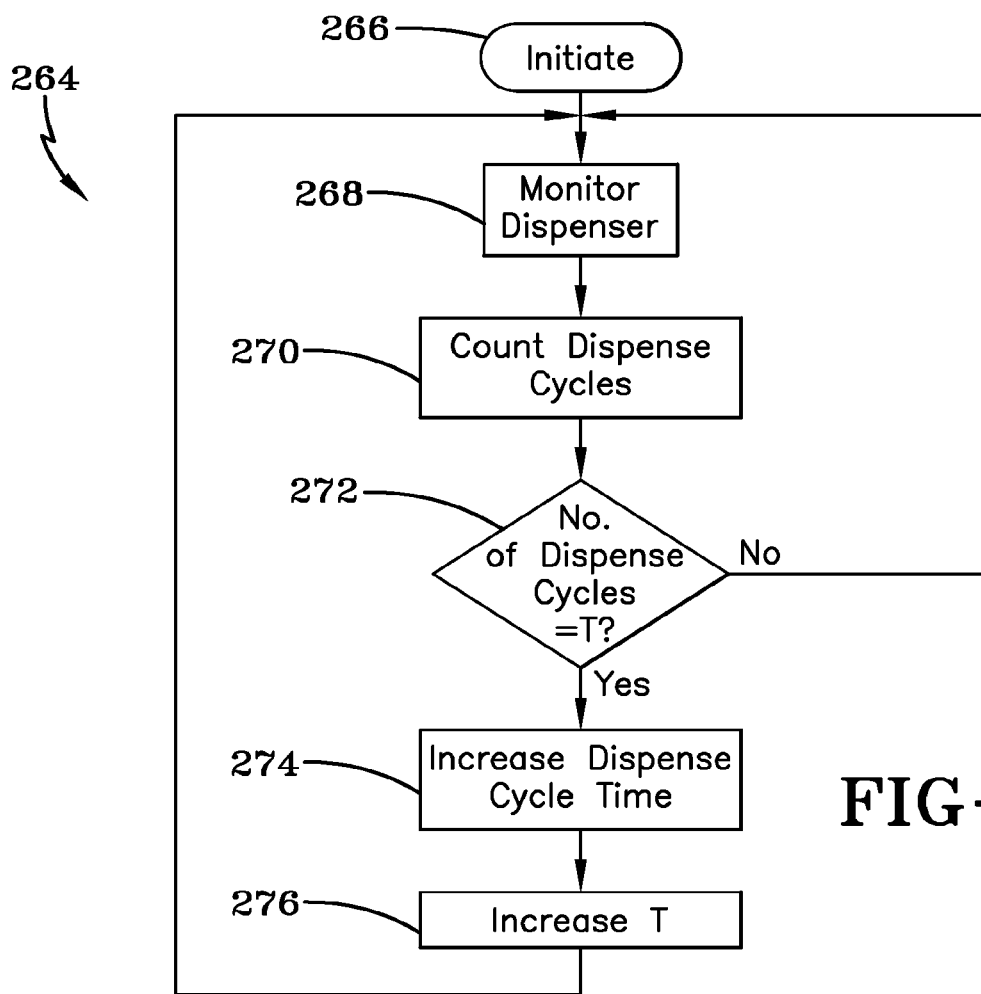
FIG. 12 is an operational flow chart for regulating the period of a dispensing cycle as a function of the volume of liquid remaining in the cartridge.
Figure 13:
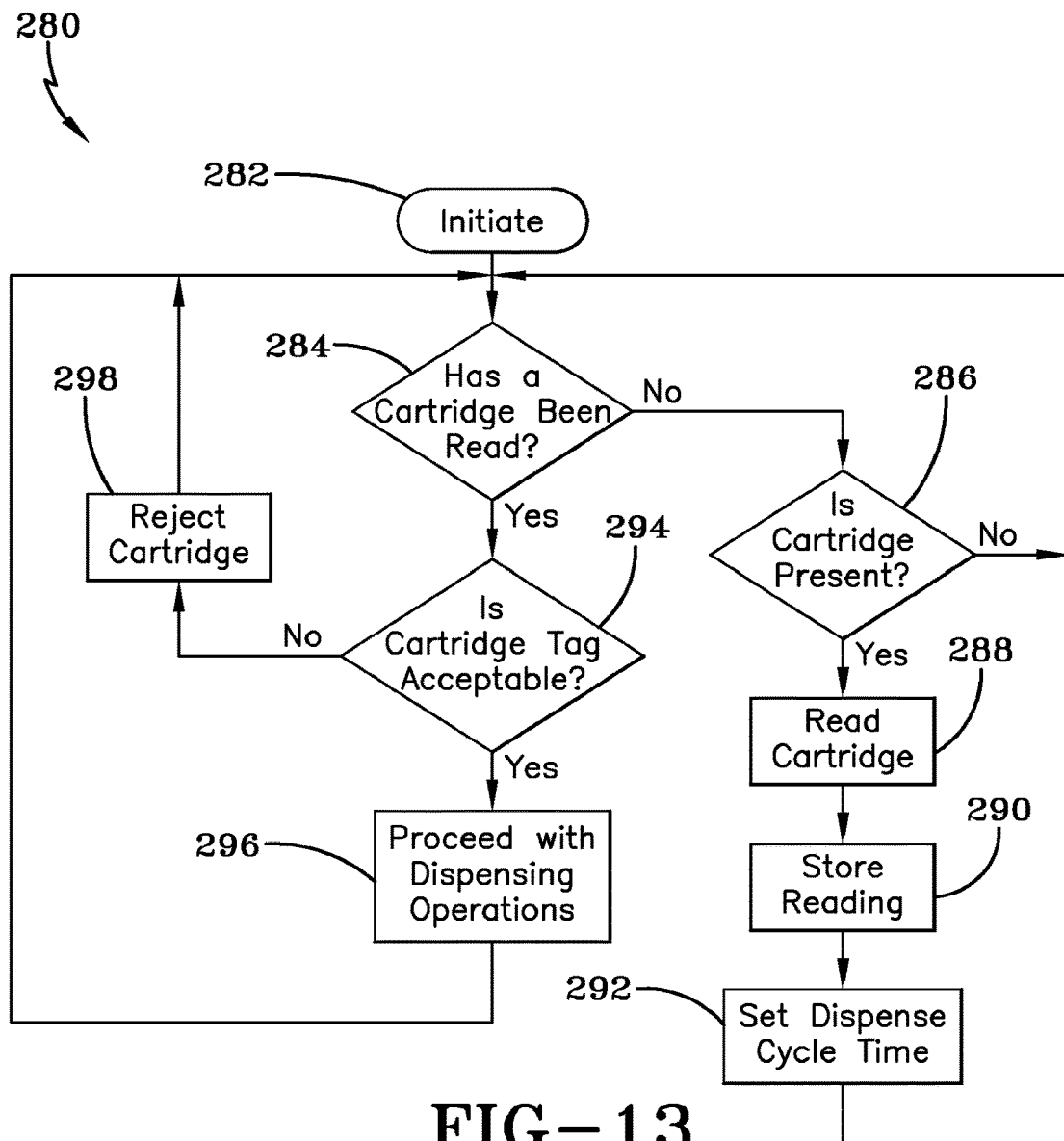
FIG. 13 is an operational flow chart for "learning" the nature of the cartridges to be accepted by the dispenser, and controlling operation as a function thereof.

With reference now to FIGS. 11-13, other features of the invention can be seen and appreciated. In FIG. 11, a dispenser system, generally illustrative of the invention, is designated generally by the numeral 250. Again, the system 250 includes a dispenser housing 252 maintaining a disposable cartridge 254 and a controller 256 therein. Again, the cartridge 254 and controller 256 are similar in nature to those presented and described above. A motor 258 is controlled by the controller 256 and interposed between controller 256 and the dispensing pump 260. The pump 260 communicates between the contents of the cartridge 254 and the nozzle 262. In accordance with the invention, it is desired that the dispense cycle time be capable of being altered as a function of various parameters. For example, it has been found that the rate at which liquid may be dispensed from a cartridge is greatest when the cartridge is full, and diminishes as the cartridge empties. Accordingly, it is desirable that the dispense cycle time for the dispenser system 250 be less when the cartridge is full than when the cartridge is nearing the empty condition, such that substantially the same amount of liquid is dispensed on each dispensing cycle, regardless of the volume of fluid in the cartridge.

Similarly, it is known that different liquids dispense at different rates, typically as a function of their viscosity. For example, liquid soaps will typically dispense at a faster rate than sanitizer gels and, accordingly, the dispense rate needs to be set as a function of the liquid being dispensed. The instant invention provides for these capabilities.

With reference now to FIG. 12, a flow chart showing the methodology by which the controller 256 can vary the dispensing cycle time as a function of the number of dispense cycles (and hence the volume remaining in the cartridge) can be seen as designated by the numeral 264. The process initiates at 266, and follows to a stage of monitoring the dispenser at 268. When a dispense cycle is entertained, it is counted as at 270. Then, at 272, a determination is made as to whether or not the number of dispense cycles has reached a threshold T. If it has not, dispensing continues in normal fashion until such time that the number of dispense cycles has reached the threshold T, indicating that the volume of liquid left within the cartridge 254 is at such a level that the dispense cycle or duration of operation of the motor 258 needs to be increased. This increase of dispense cycle time is undertaken at 274, at which time the threshold T is similarly increased at 276 and the cycle continues. It will thus be appreciated that various thresholds may be set during the depletion of the cartridge 254, with the dispense cycle being increased at each of the thresholds T. Upon replacement of the cartridge 254, the initiation 266 takes place, at which time the cycle counter is set to zero, the initial cycle time is reset, and the program begins anew.

With reference now to FIG. 13, an appreciation can be obtained of several features of the invention. As described above, it is desirable that the dispense cycle be set as a function of the liquid being dispensed, typically based upon the viscosity of the liquid. It is also desired that the dispenser system 250 be capable of learning the liquid that is to be associated therewith. Accordingly, it is contemplated that the dispenser system 250 have a learn cycle, such that the controller 256 identifies the first cartridge placed therein, and then operates in such a manner as to only receive that cartridge in the future, and to set its dispense cycle as a function of that cartridge. Accordingly, each of the dispenser systems 250 is provided with a controller 256 having the capability of "learning" each of the possible cartridges to be associated therewith, and to regulate its dispensing cycle as a function thereof. This "learning" process can be undertaken in association with RFID systems and techniques presented earlier herein. With each cartridge having a readable tag, the controller 256 can recognize the first cartridge introduced thereto and tailor all of its future operations as a function thereof. As shown in FIG. 13, a program for learning the nature of the initial cartridge, tailoring operation in association therewith, and setting and/or altering dispense cycle time is shown and designated by the numeral 280. The program initiates at 282 and enters into a monitoring stage to determine if a cartridge has been inserted into the housing 252 and if its tag has been "read" at 284. If no cartridge has been previously read, the system continues to monitor as at 286 until a cartridge is present. When a cartridge is sensed to be present at 286, its nature and identity is read as at 288 and that reading is stored in the controller 256 as at 290. The controller then sets the dispense cycle time at 292, such dispense cycle time being a characteristic of the liquid contained within the cartridge. The dispense cycle time may simply be retrieved from a look-up table in controller 256.

Program 280 then continues and when the next cartridge is offered to the dispenser 250 as at 284, a determination is made at 294 as to whether the cartridge tag is acceptable. If it is not, the cartridge is rejected as at 298, as by not allowing the door of the dispenser housing to close, or by simply inhibiting operation thereof. In any event, the program 280 is such that only specific cartridges as to brand, contents, or like nature may be accepted by the dispenser housing 252. Those parameters are set by the first cartridge placement after the dispenser is installed. If the cartridge tag is found acceptable, dispensing operations proceed as at 296.

Figure 14:
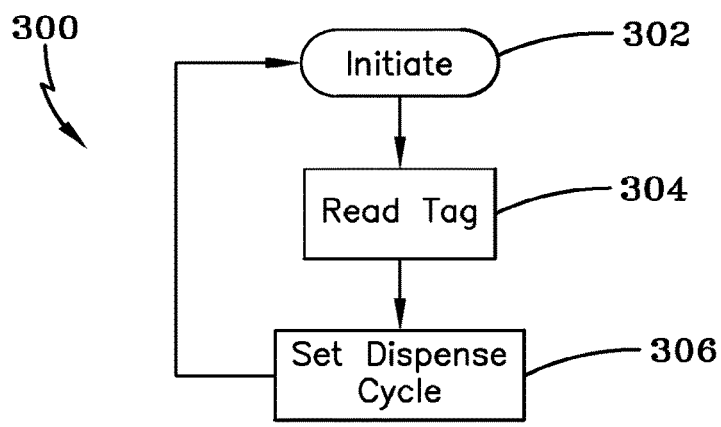
FIG. 14 is an operational flow chart showing the process for setting the dispense cycle time based upon the identify of the product maintained within the cartridge.

With reference now to FIG. 14, it can be seen that the concept of the invention also includes the capability of adjusting the dispensing pump output in order to accommodate the dispensing of various quantities of material, the various quantities being tailored to the specific material being dispensed. For example, if the dispenser dispenses a liquid soap, a different quantity would likely be dispensed than if an alcohol-based sanitizer were dispensed. Further, if the substance is dispensed as a liquid or gel, a different dispensing cycle would likely be required than if dispensing were in the form of a foam. The concept of the invention is adapted to determine the cartridge or associated tag information sufficient to adjust the number of dispenser pump cycles to ensure that the desired quantity of material is dispensed.

With continued reference to FIG. 14, it can be seen that a process for setting dispense cycles is designated by the numeral 300. According to this process, the program commences as at 302, upon closure of the dispenser door, or similar event. Thereafter, the tag of the cartridge is read as by the controller 256. The tag provides either information regarding the identity of the product in the cartridge, or specifically sets forth the required dispensed volume or number of pump strokes. Thereafter, as at 306, the dispense cycle is set by the controller to ensure that the proper number of pump cycles or strokes are engaged on each dispense cycle in order to ensure that the desired quantity is dispensed.

Those skilled in the art will readily appreciate that, in the event the tag contains either the identity of the product or the desired dispensed volume, an appropriate lookup table in the controller can be accessed to convert that information to the number of strokes or duration of pump actuation that is required. In any and all such events, the invention allows a dispenser to receive and handle the dispensing of a wide variety of products, ensuring that appropriate amounts of the product are dispensed on each dispensing cycle.

With further regard to the process 300 of FIG. 14, it will be appreciated that not only the duration or number of pump cycles may be adjusted to ensure that the proper quantity of the associated material is dispensed, but the pumping speed may also be set to ensure that the appropriate quality of the material is attained. In other words, setting of the dispense cycle may entail not only the number of pump strokes, but the speed of those strokes, or rotation of a rotary pump. When dispensing foam products, it has been found that the quality of the foam, measured by bubble size and consistency, may be a function of the pump speed. Accordingly, where the tag indicates that a foam is to be dispensed, the dispense cycle may be adjusted not only with regard to duration and strokes, but speed as well.

Figure 15:
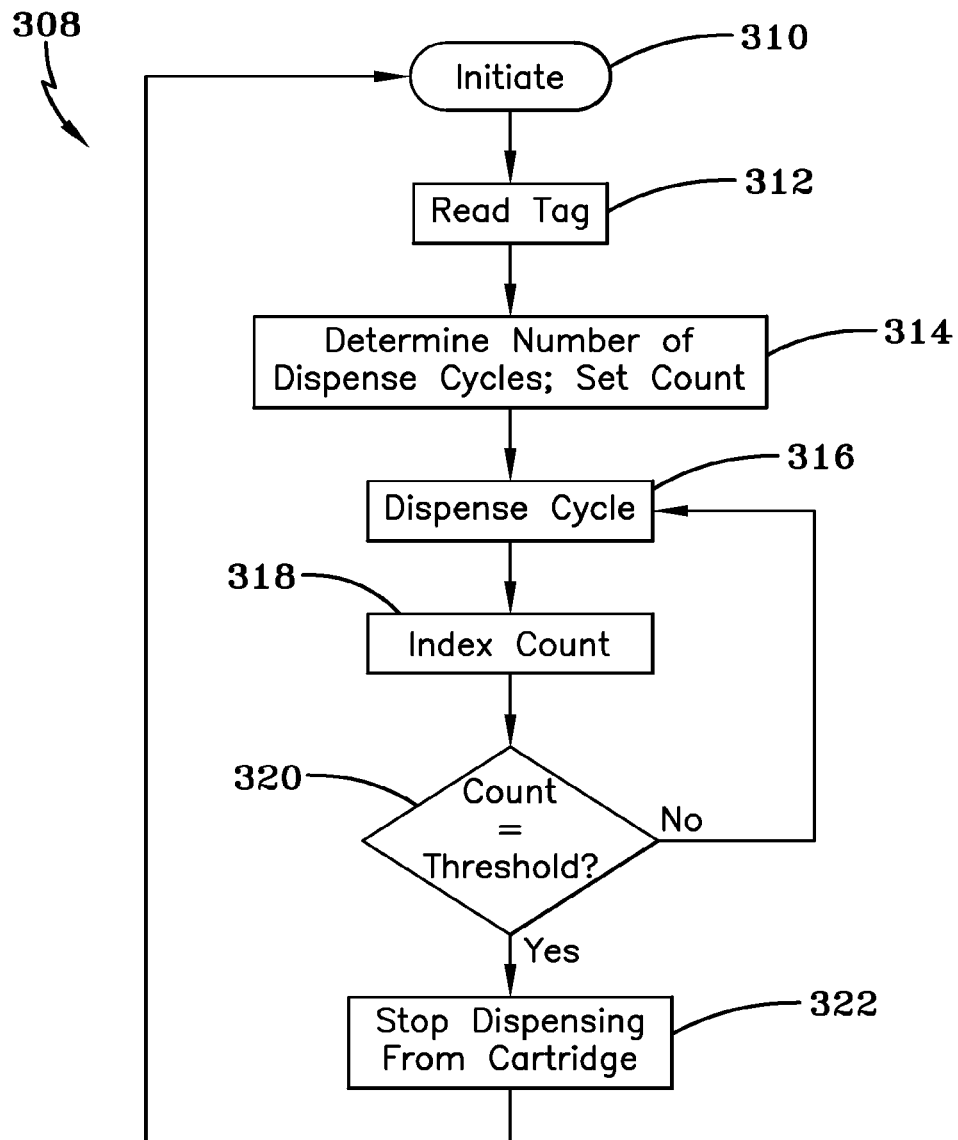
FIG. 15 is an operational flow chart for setting the number of dispense cycles available from a particular cartridge and inhibiting dispensing when that number has been reached.

Another feature of the invention is the capability of recognizing the capacity of a refill cartridge received by the dispenser, monitoring the number of dispensed cycles, and terminating dispenser operation and/or signaling when the cartridge would be deemed empty. With reference now to FIG. 15, such a process is shown as designated by the numeral 308. Here, the program commences at 310 as by closure of the dispenser door. At such time, the tag or other information on the cartridge is read as at 312. The information contained on the tag or cartridge identifies, either directly or through reference to a look-up table or the like, the volume of material contained in the cartridge. Based upon that information, the controller makes a determination at 314 as to the number of dispense cycles available from the cartridge, and that count is set by the controller in a down-counter, or, alternatively, an up-counter is set to zero. The dispenser then engages in normal operation. When a dispense cycle is disengaged as at 316, an appropriate amount of material is dispensed and the counter, whether an up-counter or down-counter, is indexed as at 318. A determination is then made at 320 as to whether the count in the counter equals a particular threshold. This threshold would typically be zero in the down-count embodiment, or the number of anticipated dispense cycles in the up-count embodiment. In either event, if the threshold has not been reached, the dispenser simply continues a normal operation by engaging subsequent dispense cycles upon request. When the count does equal the threshold as at 320, the controller terminates and precludes any further dispensing from the cartridge as at 322. It may also signal that event by the illumination of a light or other signal, indicating that the dispenser is "empty" and in need of serving. Upon such servicing, the program initiates at 310 upon replacement of the cartridge and operation begins anew.

In order to preclude unscrupulous people from simply refilling cartridges (that are intended to be disposable), and particularly from refilling such cartridges with product other than that which the cartridge indicates it contains, the invention contemplates the tag of the cartridge itself is effectively destroyed upon depletion of the cartridge contents, such that the cartridge can never again be accepted by a dispenser. In this regard, it is contemplated that the cartridge tag may be an active tag that is either up or down counted, and is only capable of being counted once. In other words, such a tag is incapable of being reset.

Figure 16:
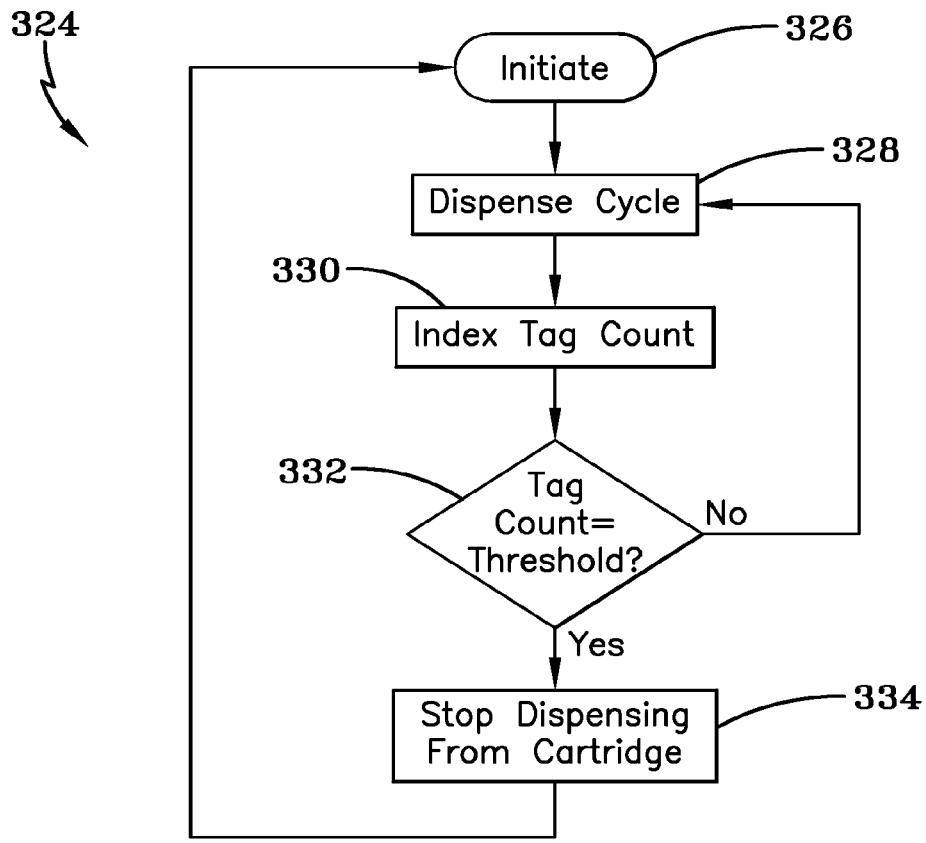
FIG. 16 is an operational flow chart showing the process used in association with an active tag, in which the cartridge tag is indexed at each dispense cycle until a predetermined number of dispense cycles have been engaged.

With reference now to FIG. 16, a process employed with such active tag is seen as designated by the numeral 324. Here, the process is initiated as at 326 by, for example, closure of the dispenser door. A dispense cycle is engaged at 328, and, upon completion of the dispense cycle, the controller causes the active tag of the cartridge to be indexed as at 330. A determination is then made at 332 as to whether the tagged count has reached a threshold, indicating that the cartridge is empty. If it has not reached that threshold, normal dispensing operations continue until the threshold is reached. At that time, as shown at 334, dispensing from the cartridge is terminated, an appropriate indicia of that fact is activated, and the dispenser awaits initiation as by replacement of the appropriate cartridge.

Figure 17:
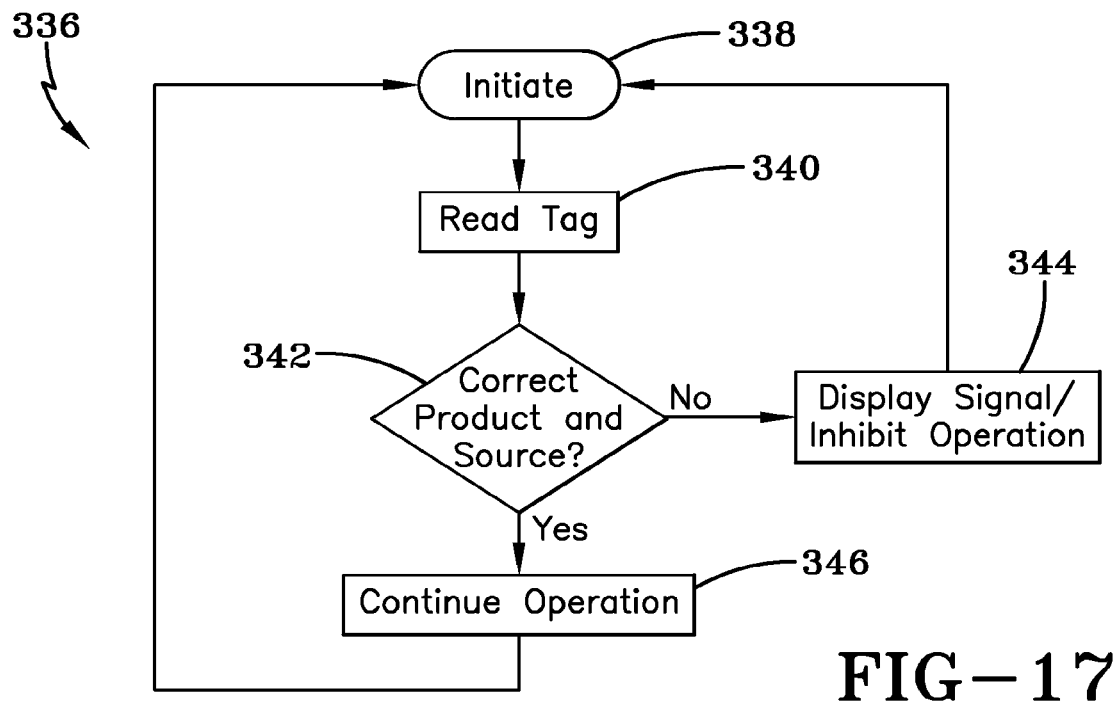
FIG. 17 is an operational flow chart according to the invention showing the process for determining from the tag of a cartridge whether the cartridge contains the correct product and/or is from an acceptable source.

The invention further contemplates that the implementation of cartridge tags and dispenser controllers may be employed to ensure that the cartridges placed within the dispenser contain the correct material for that dispenser, are of an authorized brand, and/or are provided by an authorized distributor. In that regard, a process such as that shown in FIG. 17 and designated by the numeral 336 may be employed. Again, the process is initiated as with the prior processes as at 338, and the cartridge tag is read as at 340. A determination is then made at 342 as to whether the tag indicates that the product within the cartridge is the correct product, of an appropriate brand, and from an approved distributor. If not, then the controller inhibits further operation of the dispenser and emits a display signal indicative of those facts. The display signal may be as simple as a light, or may be as sophisticated as a liquid crystal display, presenting the specific nature of the problem encountered. The dispenser then awaits appropriate servicing and initiation as at 338. If, however, it was determined that appropriate product, brand and distributor were associated with the cartridge, operation continues as at 346 and other subprograms for dispensing can be engaged.

As presented above, it is contemplated that any particular dispenser housing may be adapted to receive any of various dispenser cartridges. Thus far, the implementation of a cartridge tag, whether active or passive, in association with a controller has been presented to ensure that the dispenser is operated only with approved products. The invention also contemplates physical adaptability, to accommodate cartridges of various physical sizes. In this regard, those skilled in the art will appreciate that a dispenser typically comprises a housing that includes a back plate mounted to a wall or other surface, along with sidewalls, and a cover. These elements define a cavity within which a cartridge of a specified dimension can be received and replaced. However, cartridges come in various sizes, typically from as small as a half liter to as large as five liters, with sizes on the order of one liter and 0.75 liters being most common. However, presently known dispensers are of fixed configuration, adapted to only accommodate cartridges of one specific size and physical dimension. Accordingly, the instant invention contemplates further adaptability of dispensers by accommodating cartridges of a range of physical sizes and configurations.

Figure 18:
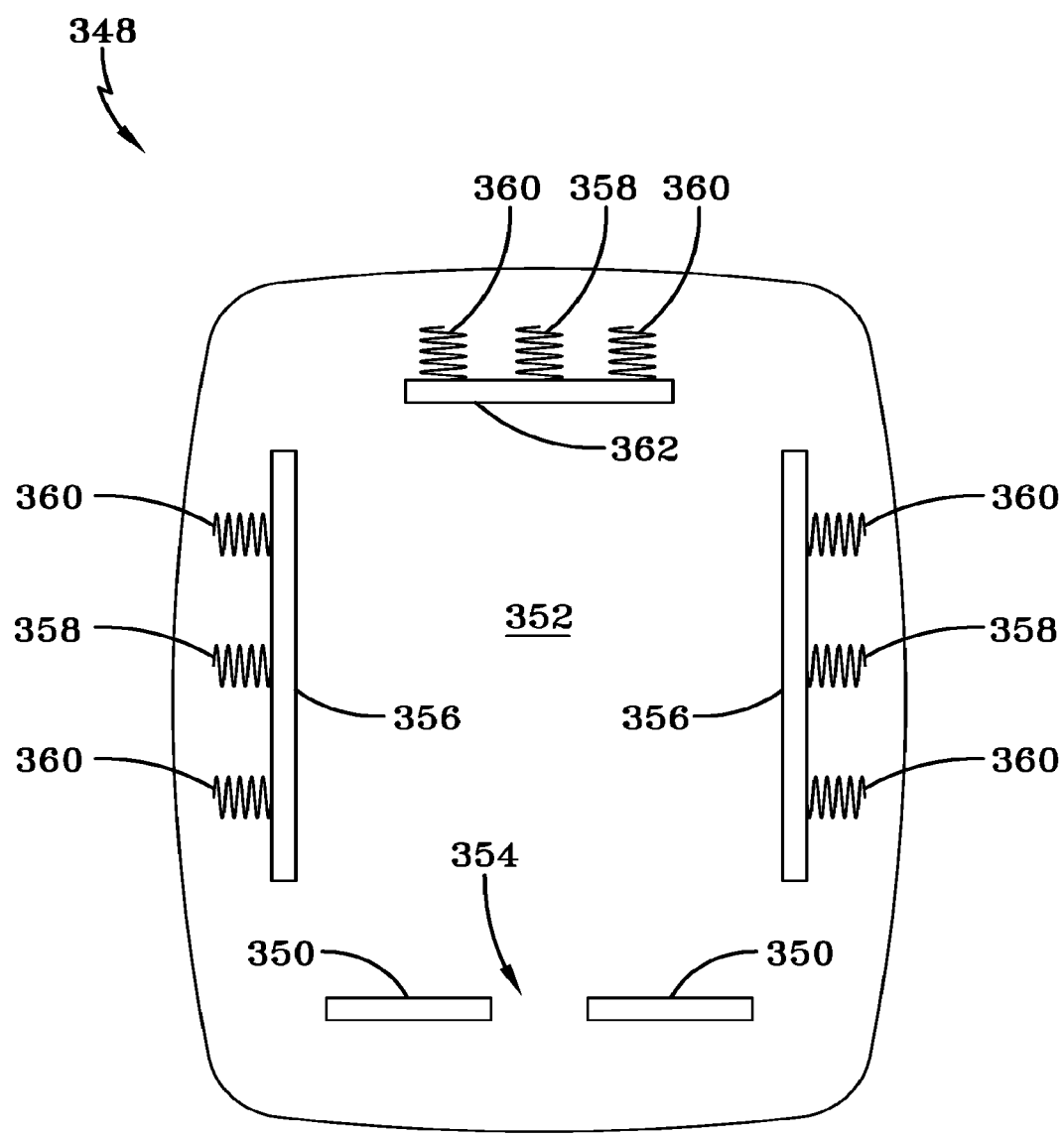
FIG. 18 is an illustration of a dispenser made in accordance with the invention that is adaptable and adjustable to accommodate various cartridges.

As shown in FIG. 18, a relevant portion of a dispenser housing of an adjustable nature is shown illustratively and designated by the numeral 348. The dispenser housing 348 is shown without the door or front cover for illustrative purposes. As illustrated, the dispenser housing 348 has a pair of support ledges or brackets 350 at a bottom portion thereof that are preferably fixedly attached to and extend from the back plate 352. Defined between the support ledges 350 is an opening 354 of such a size and configuration as to receive the neck of a wide range of cartridges, the neck typically housing and including the pump and nozzle mechanisms. Typically, the cartridge rests upon the spaced ledges 350, with the neck extending through the opening 354 with the nozzle exiting the dispenser in standard fashion.

The invention contemplates that side and top support to the cartridge can be given by means of adjustable side and top plates. As shown, adjustable side plates 356 are maintained within the cavity of the housing 348 and spaced apart in parallel relationship to each other. Each of the adjustable side plates 356 includes an index tab 358 for locking in selected positions as in tracks or the like (not shown) formed within the housing 348. It is contemplated that biasing springs 360 may also be interposed between the side plates 356 and portions of the housing 348 in order to urge the plates 356 against the locking tabs 358 when selectively positioned, in order to hold the plates 356 in a desired position. Similarly, an adjustable top plate 362 is contemplated for adjustability through the use of an indexed tab 358 and biasing springs 360. Accordingly, it can be seen that the effective size of the cavity of the dispenser housing 348 can be tailored on site to accommodate the physical size and configuration of the cartridge to be employed. Accordingly, the invention provides for dispensers that are adaptable, both physically and electronically to the receipt, maintenance, and usability of a wide range of cartridges.

With reference now to FIGS. 19A-19D, yet another embodiment of the invention in which the dispenser housing is adapted for receiving various dispenser cartridges is illustrated and designated by the numeral 364. As shown, the dispenser 364 includes a back plate 366 adapted to be fixed to a wall or the like through the use of screws, hangers, or other appropriate means. A cover 368 is connected to the back plate 366 by means of a hinge 370, defining a cavity therebetween.

A telescoping cup 372 is adjustably received by the back plate 366 by means of a slide or track, as will readily be appreciated by those skilled in the art. The telescoping cup 372 may be fixed at any of various positions with respect to the back plate 366 to accommodate cartridges of various sizes. To this end, a flange 374 having an aperture 376 extending therethrough protrudes from a back edge of the cup 372. A plurality of spaced apertures 378 are provided in the back plate 366 and in alignment with the aperture 376 when the cup 372 is slidably positioned with respect to the back plate 376. When the cup 372 is moved to its desired position, a screw may be passed through the aperture 376 and associated aperture 378 and into the wall or other mounting surface, thereby mounting the dispenser 364 to the wall while securing the cup 372 in fixed relation to the back plate 366, for receipt of a particular size of cartridge.

It will be appreciated by those skilled in the art that various means may be employed for selectively positioning the cup 372 with respect to the back plate 366. Screws may be employed as presented above, although the screws may simply be used to pass through the apertures 376, 378, and not be used for mounting purposes. Alternatively, openings 380 may be provided in the back plate 366 and may be adapted for receipt by hangers or the like secured to the wall for hanging the dispenser on the wall. Alternatively, the openings 380 may be adapted to receive hooks or tabs extending from a back portion of the cup 372 for adjustable positioning of the cup 372 with respect to the back plate 366.

Figure 19A:
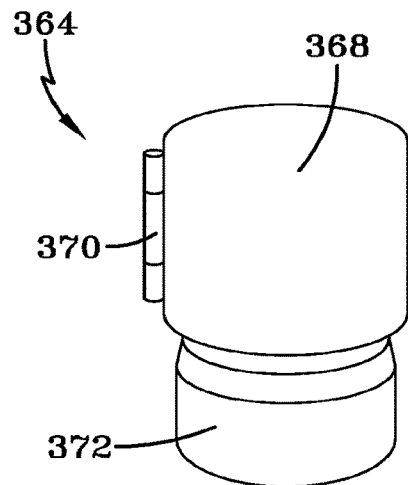
FIGS. 19A-19D illustrate a second embodiment of an adaptable and adjustable dispenser of a telescoping nature for various sizes of cartridges.
Figure 19B:
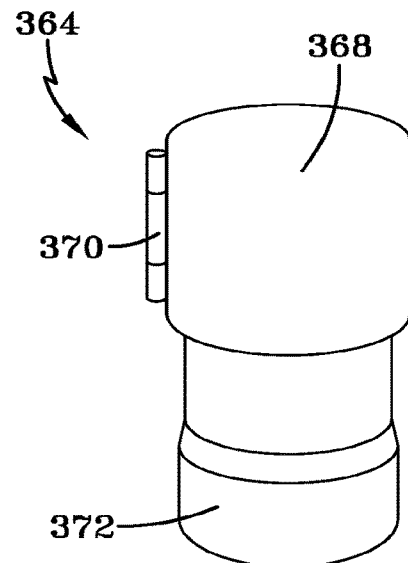
Figure 19C:
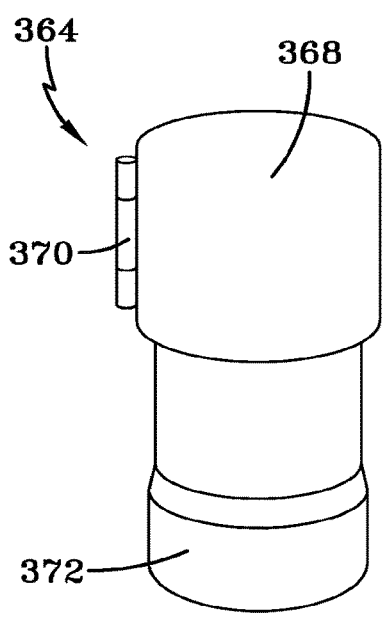

As shown in FIG. 19A, the cup 372 is fully telescoped within the cavity defined between the cover 368 and back plate 366. In this position, very small cartridges may be employed. It is also contemplated that the dispenser 364 will be collapsed as shown in FIG. 19A for purposes of shipping, thus reducing the size of the packages or cartons required for such shipping. In FIG. 19B, the cup 372 is extended to an intermediate position, for receipt of cartridges of a particular size. In FIG. 19C, the cup 372 is fully extended, to receive cartridges of yet a larger size. It will be appreciated that regardless of the extension of the cup 372, the cover 368 is sufficient to conceal the upper top portion of the cup, as shown in FIG. 19C.

Figure 19D:
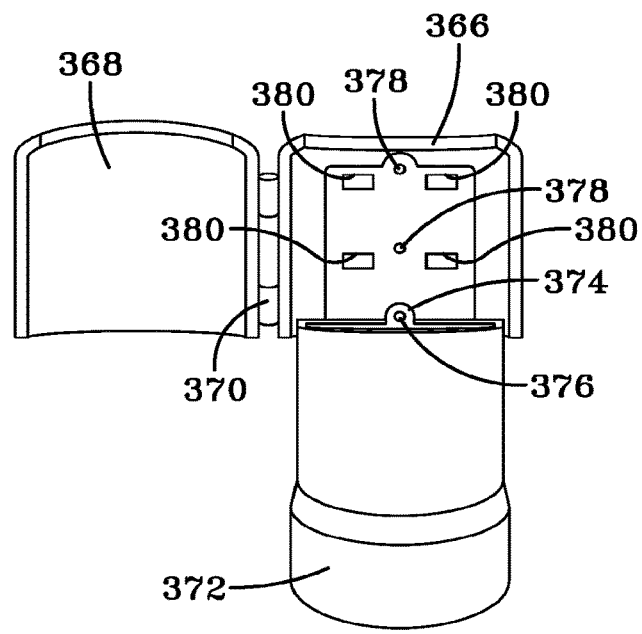

FIG. 19D shows the dispenser 364 at the same point of extension as in FIG. 19C, but with the cover 368 open. This drawing illustrates the degree of overlap of the cover 368 with the cup 372, and demonstrates the definition of the cavity achieved by the combination of the cup 372 and the portion defined between the cover 368 and the back plate 366. This entire cavity is available for receiving a cartridge.

It will be appreciated that the dispenser 364 is shown without illustration of the dispenser nozzle, valve, pump or the like. The illustrations of FIGS. 19A-19D are for illustrative purposes only.

It can thus be seen that the utilization of a controller in the dispensing systems allows for assurance that only approved cartridges are placed within the dispenser, that the appropriate amount of liquid is dispensed from the dispenser, that the cartridge is switched before being empty, and a host of other actions may be taken consistent with user-friendly dispensing.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. A soap or sanitizer dispenser comprising:
   a housing;
   a receptacle;
   a refill unit at least partially received by the receptacle;
   an RFID antenna;
   an RFID controller;
   an actuation mechanism;
   logic for reading a dispense count that relates to a first volume of fluid in the refill unit from an RFID tag on the refill unit;
   logic for writing a dispense count that relates to a second volume of fluid in the refill unit on an RFID tag on the refill unit;
   wherein the second volume of fluid in the refill unit is less than the first volume of fluid in the refill unit;
   logic for determining whether the dispense count is indicative of the first volume of fluid having been dispensed from the refill unit;
   logic for allowing fluid to be dispensed from the refill unit if the dispense count is indicative of at least a portion of the first volume of fluid in the refill unit is remaining in the refill unit; and
   wherein the dispenser does not dispense fluid if the dispense count is indicative of the first volume of fluid having been dispensed from the refill unit.

2. The soap or sanitizer dispenser of claim 1 wherein the RFID tag is secured to the refill unit.

3. The soap or sanitizer dispenser of claim 1 further comprising a power source external to the dispenser that is coupled to the dispenser to provide a source of operating power to at least the RFID controller and the RFID antenna.

4. The soap or sanitizer dispenser of claim 3 wherein the source of operating power is contained in a key.

5. The soap or sanitizer dispenser of claim 4 wherein the key is secured to the refill unit.

6. The soap or sanitizer dispenser of claim 1 further comprising reading a unique identification code from the RFID tag.

7. The soap or sanitizer dispenser of claim 6 further comprising logic that utilizes the unique identification code to determine whether to allow the dispenser to dispense fluid.

8. A soap or sanitizer dispenser comprising:
a housing;
a receptacle for receiving a refill unit that contains a soap or sanitizer;
an RFID antenna;
an RFID controller;
an actuation mechanism;
logic for reading a unique identification code from an RFID tag;
obtaining a refill unit total volume of fluid;
logic for reading data indicative of a first volume of fluid in the refill unit from the RFID tag;
logic for writing data indicative of a second volume of fluid to the RFID tag,
wherein the second volume of fluid is less than the first volume of fluid; and
wherein the difference between the first volume and the second volume is the amount of fluid dispensed from the refill unit;
logic for determining whether the second volume is indicative of more fluid being dispensed than the refill unit total volume of fluid;
wherein the dispenser does not dispense fluid if the second volume is indicative of more fluid having been dispensed than the refill unit total volume of fluid.

9. The soap or sanitizer dispenser of claim 8 further comprising a refill unit.

10. The soap or sanitizer dispenser of claim 9 wherein the RFID is secured to the refill unit.

11. The soap or sanitizer dispenser of claim 9 further comprising an external power source that may be coupled to at least the RFID controller and RFID antenna for providing power to the RFID controller and RFID antenna.

12. The soap or sanitizer dispenser of claim 11 wherein the external power source is located at least partially in a key.

13. The soap or sanitizer dispenser of claim 12 wherein the key is inserted into the dispenser.

14. The soap or sanitizer dispenser of claim 8 wherein the RFID tag contains information indicative of a unique identification code.

15. A method of operating a soap or sanitizer fluid dispenser comprising:
providing a refill unit for being installed in a dispenser;
the refill unit having a data storage device secured thereto;
reading data indicative of an identification number from the data storage device on the refill unit;
obtaining a refill unit total volume of fluid;
dispensing a quantity of the refill unit total volume of fluid;
writing data indicative of a volume of fluid remaining in the refill unit to the data storage device;
comparing the data indicative of the volume of fluid remaining in the refill unit to the total volume of fluid;
detecting the presence of a user's hand proximate an outlet nozzle of the dispenser;
dispensing a dose fluid if the data indicative of the volume of fluid remaining in the refill unit indicates that less fluid has been dispensed from the refill unit than the refill unit total volume of fluid; and
preventing the dispensing of fluid if the comparative data is indicative of the volume of fluid remaining in the refill unit indicates that more fluid has been dispensed from the refill unit than the refill unit total volume of fluid.

16. The method of operating a soap or sanitizer fluid dispenser of claim 15 further comprising providing a power source external to the dispenser for providing power to an RFID reader located in the dispenser.

17. The method of operating a soap or sanitizer fluid dispenser of claim 16 wherein the external power source is inserted in the dispenser.

18. The method of operating a soap or sanitizer fluid dispenser of claim 17 wherein the external power source is inserted in the dispenser when the refill unit is inserted into the dispenser.

19. The method of operating a soap or sanitizer fluid dispenser of claim 15 further comprising reading data indicative of a unique identifier of the refill unit.

20. The method of operating a soap or sanitizer fluid dispenser of claim 19 wherein the dispenser is permitted to dispense fluid as a function of the data indicative of the unique identifier of the refill unit and the dispenser is prevented from dispensing fluid as a function of the data indicative of the unique identifier.

* * * * *